US009004997B1

(12) United States Patent
Prosin et al.

(10) Patent No.: US 9,004,997 B1
(45) Date of Patent: Apr. 14, 2015

(54) PROVIDING ENHANCED GAME MECHANICS

(71) Applicant: Wargaming.net LLP, London (GB)

(72) Inventors: Alexey Prosin, Minsk (BY); Stepan Drozd, Minsk (BY)

(73) Assignee: Wargaming.net LLP, London (GB)

(*) Notice: Subject to any disclaimer, the term of this patent is extended or adjusted under 35 U.S.C. 154(b) by 0 days.

(21) Appl. No.: 14/205,990

(22) Filed: Mar. 12, 2014

(51) Int. Cl.
 *A63F 13/00* (2014.01)
(52) U.S. Cl.
 CPC .................................... *A63F 13/005* (2013.01)
(58) Field of Classification Search
 CPC . A63F 13/00; A63F 2300/10; A63F 2300/63; A63F 2300/646; A63F 2300/6661; A63F 2300/6684; A63F 2300/8076
 USPC .................................................. 463/2, 5, 7, 36
 See application file for complete search history.

(56) References Cited

U.S. PATENT DOCUMENTS

| 2007/0270215 | A1* | 11/2007 | Miyamoto et al. ............... 463/32 |
| 2009/0181736 | A1* | 7/2009 | Haigh-Hutchinson et al. ... 463/2 |
| 2010/0009733 | A1* | 1/2010 | Garvin et al. ..................... 463/5 |
| 2012/0322523 | A1* | 12/2012 | Woodard et al. .................. 463/2 |

* cited by examiner

Primary Examiner — James S McClellan
(74) Attorney, Agent, or Firm — Banner & Witcoff, Ltd.

(57) ABSTRACT

Methods, systems, computer-readable media, and apparatuses for dynamically locking a camera-linked reticle onto a target vehicle are presented. In one or more embodiments, a computing device may provide a user interface that includes a controlled vehicle and a target vehicle. Subsequently, the computing device may receive user input moving a camera-linked reticle within a predetermined distance of the target vehicle. In response to receiving the user input moving the camera-linked reticle within the predetermined distance of the target vehicle, the computing device may lock the camera-linked reticle onto the target vehicle. In some embodiments, the camera-linked reticle may include a reticle portion of the user interface that is configured to indicate an aim of at least one gun associated with the controlled vehicle, and may be further configured to maintain a substantially constant directional relationship with a viewing angle.

24 Claims, 29 Drawing Sheets

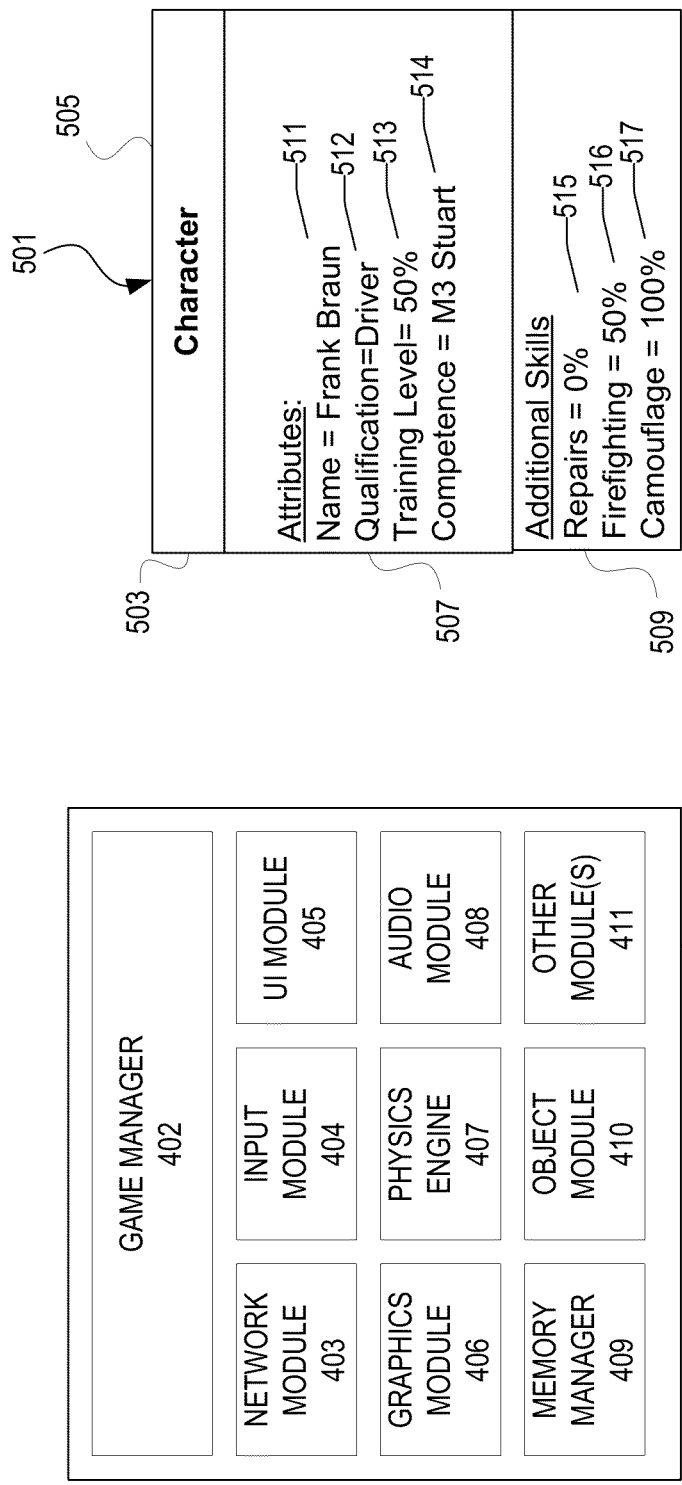

Vehicle — 551

Attributes:
Name: Liechttraktor — 561
Hit Points: 110 — 563
Weight/Load limit: 7.5/9.2 — 564
Engine Power (h.p.) = 51 — 565
Speed Limit = 46 km/h — 566
Hull Armor (front/side/rear mm)= 14/12/12 — 567
Turret Armor (front/side/rear mm) = 14/12/12 — 568
Standard Shell Damage = 24-40 — 569
Standard Shell Penetration (mm) 26-43 — 570
Rate of Fire (rounds/min) = 30 — 571
Turret Traverse Speed (deg/sec) — 572
View Range (m) = 270 — 573
Signal Range (m)= 100 — 574

Module:
Gun: 37 mm M-5 — 575
Turret: D37812 — 576
Engine: Continental W-670 — 577
Suspension: Stuart E1 — 578
Radio: SCR 209 — 579
Additional: — 580

*FIG. 5B*

PROVIDING ENHANCED GAME MECHANICS

FIELD

Aspects of the disclosure relate to computing hardware and computer software. In particular, one or more aspects of the disclosure generally relate to computing hardware and computer software for providing enhanced game mechanics.

BACKGROUND

Video games, particularly massively multiplayer online (MMO) games and massively multiple online role-playing games (MMORPGs), are becoming increasingly popular. In addition, these games are becoming more sophisticated and providing numerous gameplay modes and various other features.

As video games continue to grow in popularity and complexity, it may be difficult to provide new, different, and challenging gameplay experiences that both excite and engage users without overwhelming users with difficulties that may be, or at least seem, insurmountable. Moreover, as smart phones, tablet computers, and other touchscreen-equipped computing devices become increasingly popular, providing user interfaces and user interface controls that are convenient, intuitive, and easy-to-use on these touch-enabled devices also may be challenging.

SUMMARY

Aspects of the disclosure provide convenient, efficient, intuitive, and easy-to-use game mechanics that can be implemented in a video game, such as an MMO or an MMORPG. In particular, some aspects of the disclosure may be particularly advantageous when implemented in video games that are executed on and/or provided via touch-enabled devices, such as smartphones, tablet computers, and/or other touchscreen-equipped computing devices, as these aspects may provide features that are particularly convenient, intuitive, and easy-to-use when used on such devices.

For example, some aspects of the disclosure provide systems and methods for dynamically determining and applying a zoom amount when entering a sniper mode. In one or more embodiments, a computing device may provide a user interface that includes a controlled vehicle and a target vehicle. Subsequently, the computing device may receive a request to enter a sniper mode. In response to receiving the request to enter the sniper mode, the computing device may determine a zoom amount based on a size of the target vehicle (which may, e.g., be determined and/or expressed as a number of pixels, such as the number of pixels occupied by the target vehicle when presented in a user interface and/or displayed on a display screen) and a distance from the controlled vehicle to the target vehicle (which may, e.g., correspond to the amount of distance between the vehicles in a virtual world, as calculated by a video game engine providing the virtual world that includes the vehicles). The computing device then may update the user interface based on the zoom amount to enter the sniper mode.

Other aspects of the disclosure provide systems and methods for dynamically locking a camera-linked reticle onto a target vehicle, which may provide a feature that may be referred to as "follow-aim" in some instances. In one or more embodiments, a computing device may provide a user interface that includes a controlled vehicle and a target vehicle. Subsequently, the computing device may receive user input moving a camera-linked reticle within a predetermined distance of the target vehicle. In response to receiving the user input moving the camera-linked reticle within the predetermined distance of the target vehicle, the computing device may lock the camera-linked reticle onto the target vehicle.

BRIEF DESCRIPTION OF THE DRAWINGS

The present disclosure is illustrated by way of example and not limited in the accompanying figures in which like reference numerals indicate similar elements and in which:

FIG. 4 depicts a block architecture diagram of software modules that may be used to implement various features discussed herein.

FIG. 5A depicts an instance of a character object according to one or more illustrative aspects discussed herein.

FIG. 5B depicts an instance of a vehicle object according to one or more illustrative aspects discussed herein.

FIGS. 7A-7F depict example screenshots of video game user interfaces that may be displayed in dynamically determining and applying a zoom amount in accordance with one or more illustrative aspects discussed herein.

FIGS. 11A-11E depict example screenshots of video game user interfaces that may be displayed in maintaining aim of a camera-linked reticle as a controlled vehicle moves in accordance with one or more illustrative aspects discussed herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As noted above, certain embodiments are discussed herein that relate to providing enhanced game mechanics. Before discussing these concepts in greater detail, however, several examples of a network environment, a virtual world client, and a virtual world server will first be discussed with respect to FIGS. 1-3. In addition, several examples of software modules, character objects, and vehicle objects that may be used in accordance with various aspects of the disclosure will also be discussed with respect to FIG. 4 and FIGS. 5A and 5B.

Figure 1:
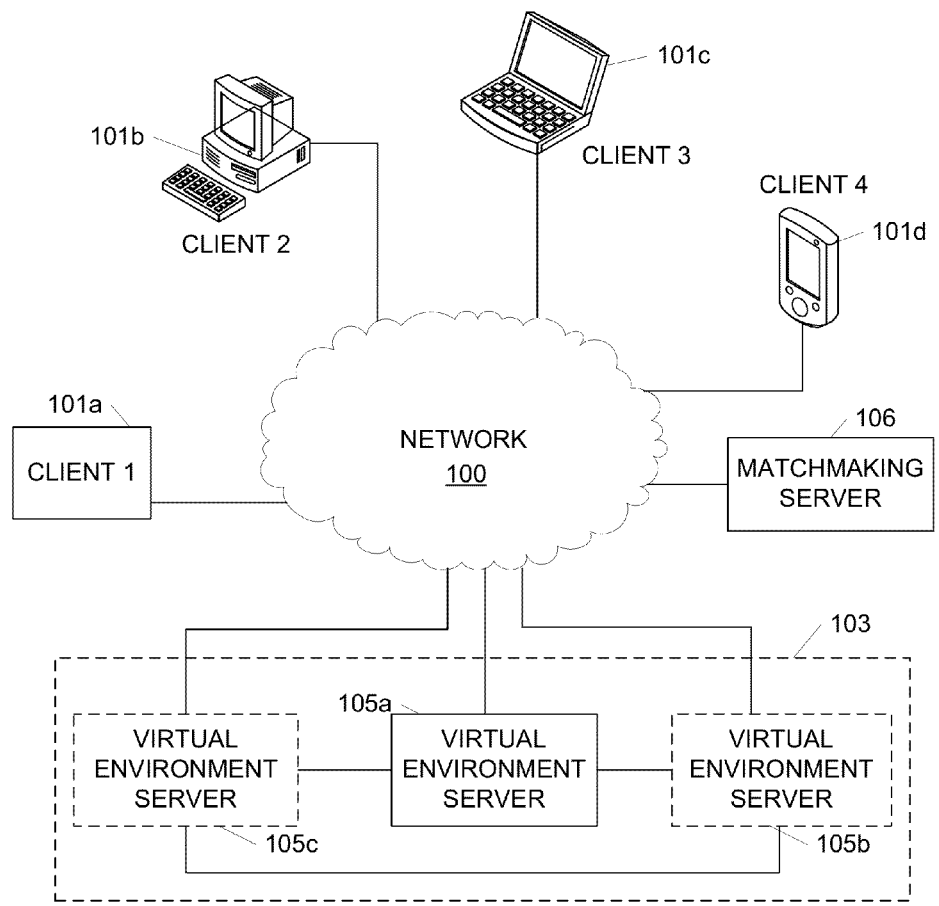
FIG. 1 depicts an example of a network environment that may be used in accordance with one or more illustrative aspects discussed herein.

FIG. 1 illustrates a network environment in which clients 101 may interact with virtual world servers 105 to provide a virtual world for users to access. Clients 101 may include a variety of devices including generic data processing device 101a, personal computer (PC) 101b, laptop, portable, or netbook computer 101c, personal data assistant, mobile phone or device 101d, a tablet device (not shown) and the like. Each of clients 101 may have a network adapter (and software) that allows clients 101 to connect to virtual world servers 105 through network 100. In one example, network 100 may include an Internet Protocol (IP) based network, e.g., the Internet. Other networks may include cellular networks, cable networks, fiber optic networks, wireless networks, wired network and/or combinations thereof. Network 100 may further include one or more sub-networks such as wired or wireless local area networks (LANs), wide area networks (WANs), and the like.

In one or more arrangements, virtual world servers 105 may be included in a virtual world server system 103 that includes multiple linked physical and/or logical servers 105. Using such a distributed system, servers 105 may be able to distribute load across each of server 105. For example, if server 105a is experiencing high loads, some of the operations may be passed to either server 105b or 105c or both. Load may further be distributed based on user geography or on other predetermined bases. Alternatively, the virtual world may be hosted on a single server, e.g., virtual world server 105a. Each of servers 105 may collectively generate and manage a single instance of the virtual world, or each server 105a, 105b and 105c may provide independent instances of the world. An instance of a virtual world, as used herein, describes a stand-alone instance of the virtual world that does not interact with or depend on other instances of the virtual world. Depending on the processing load, a virtual world server system 103 may divide a plurality of users among multiple instances of the virtual world, to reduce or alleviate overloading on a single server or prevent overpopulation. Each server 105 may be logical or physical, e.g., multiple logical servers may reside and be running on the same physical computing device/server, or servers may be physically separate devices.

The network environment of FIG. 1 may also associate with one or more matchmaking servers 106. As used herein, a matchmaking server 106 may determine what set of players to assign to a same instance of the virtual world to ensure that all players meet predefined criteria for that instance of the virtual world. In some arrangements, additional and/or alternative servers may be provided (e.g., in addition to and/or instead of matchmaking servers 106) in the network environment. For example, one or more center servers may be provided that may be configured to manage user logins and/or store account data, and one or more periphery servers may be provided that may be configured to manage actual gameplay.

Figure 2:
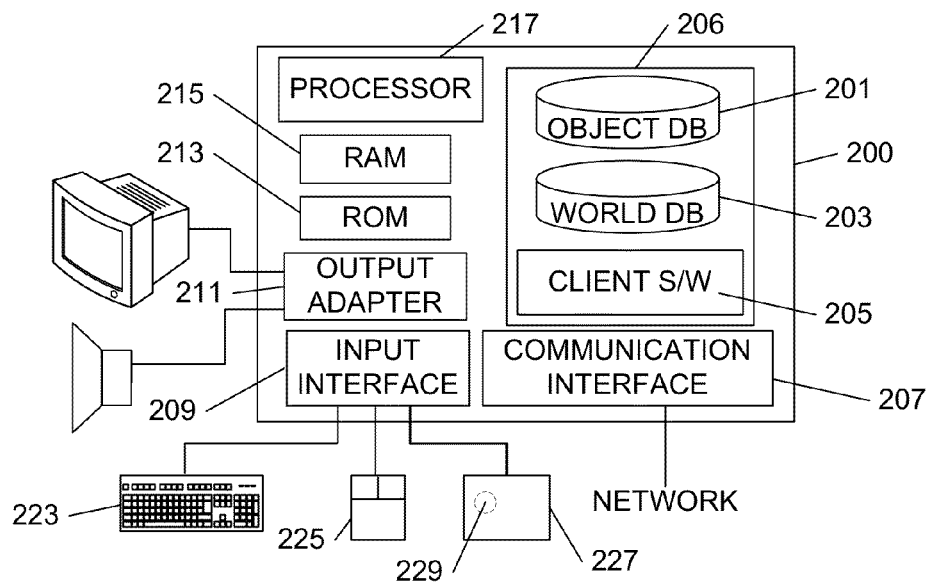
FIG. 2 depicts a block diagram illustrating an example virtual world client according to one or more aspects discussed herein.

FIG. 2 illustrates an example client device 200 such as PC 101b (FIG. 1) that may be used to access and interact with a virtual world provided by a virtual world server such as server 105a of FIG. 1. Client device 200 may include a variety of components and modules including a processor 217, random access memory (RAM) 215, read only memory (ROM) 213, databases 201 and 203, client software 205, output adapter 211, input interface 209 and communication interface 207. Software, databases, operating systems, and the like may be stored in nonvolatile memory 206 (e.g., a magnetic disk or solid state hard drive, or equivalent). Object database 201 may be configured to store data defining and otherwise associated with an object used by a user of device 200 to explore and interact with the virtual world. World database 203, on the other hand, may be configured to store data for defining and generating the environment in which the objects exist. For example, world database 203 may store texture maps for rendering a floor or ground, walls, a sky and the like. In another example, world database 203 may store simulated environments, buildings, trees and other data defining animate or inanimate objects existing in the world, data defining computer controlled characters and the like. Each of database 201, 203 may or may not be a conventional database, and instead may refer to data stored in a memory, which is accessed as needed by the client software. Data associated with an object or the virtual world may be communicated between client device 200 and a virtual world server using communication interface 207. For example, object positions, attributes and status may be updated or environments may be changed by communicating such data through interface 207.

The world and the objects may be graphically rendered by client software 205 and subsequently sent to output adapter 211 and display 219. The client software 205 may, in one or more arrangements, be configured to generated three dimensional (3-D) models of the virtual world and components thereof as well as the object corresponding to a user. A user may control the object and interact with the world through input interface 209 using various types of input devices including keyboard 223, mouse 225, and one or more touch sensors 227 that sense when a user has pressed his or her finger at various locations, such as location 229. In some embodiments the one or more touch sensors 227 may be included in a touch pad, touch screen or the like. Devices that include one or more touch sensors 227 may detect various gestures performed by a user as one or more of his or her fingers are pressed onto the one or more touch sensors 227 (or the touch pad, touch screen, etc.). There are various types of touch sensors that a device may use, including capacitive touch sensors and resistive touch sensors. Some touch sensors may be usable with a stylus and a user may use the stylus instead of his or her finger to provide input to the touch sensor. Additionally, some touch sensors may be able to detect a single touch, while other touch sensors may be able to detect multiple touches at a given time. Other types of input devices may include a microphone (e.g., for voice communications over the network), joysticks, motion sensing devices and/or combinations thereof. In one or more arrangements, music or other audio such as speech may be included as part of the virtual world. In such instances, the audio may be outputted through speaker 221.

Client software 205, computer executable instructions, and other data used by processor 217 and other components of client device 200 may be stored in and/or by RAM 215, ROM 213, nonvolatile memory 206 or a combination thereof. Other types of memory may also be used, including both volatile and nonvolatile memory. Software 205 may provide instructions to processor 217 such that when the instructions are executed, processor 217, client device 200 and/or other components thereof are caused to perform functions and methods described herein. In one example, instructions for generating a user interface for interfacing with the virtual world server may be stored in RAM 215, ROM 213 and/or nonvolatile memory 206. Client software 205 may include both applications and operating system software, and may include code segments, instructions, applets, pre-compiled code, compiled code, computer programs, program modules, engines, program logic, and combinations thereof. Computer executable instructions and data may further be stored on some physical form of computer readable storage media (referred to herein as "computer memory") including, e.g., electrically erasable programmable read-only memory (EEPROM), flash memory or other memory technology, CD-ROM, DVD or other optical disk storage, magnetic cassettes, magnetic tape, magnetic storage and the like.

Figure 3:
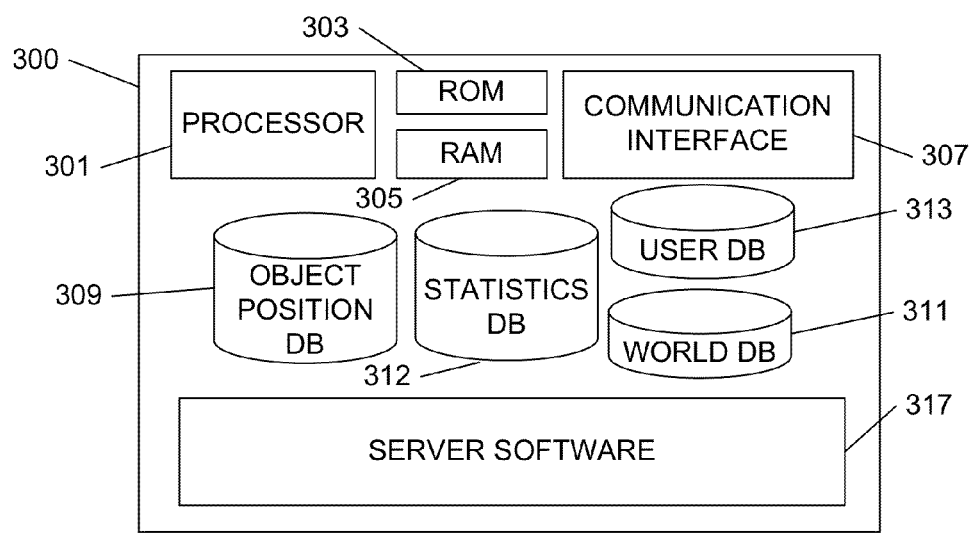
FIG. 3 depicts a block diagram illustrating an example virtual world server according to one or more aspects discussed herein.

Referring now to FIG. 3, a virtual world server 300 (e.g., an instance of server 105) may be configured to generate and operate a massive multiplayer online game, such as a virtual world or the like. Server 300 may include processor 301, ROM 303, RAM 305, communication interface 307, object position database 309, world database 311, user database 313, server software 317, and a statistics database 312. Object position database 309 may be configured to store position information for each object (e.g., based on commands to move a vehicle received from each client). The statistics database 312 may be configured to store and/or transfer statistics relevant to game operation, including, for example, tracking player achievement and general game server performance.

A world database 311 may store rules, algorithms, and other data for interactions that are available in the world. For example, a manner in which a computer controller character moves or otherwise behaves may be defined in data stored in world database 311. Additionally, item information may be defined in world database 311 so that items may not be modified by each client. In another example, world database 311 may store location information for non-object items and components. User database 313, on the other hand, may be configured to store information describing a user controlling an object. For example, user database 313 may include account information, user preferences, one or more classes of user experience points and/or levels, payment information, user identification information, character definitions, state tables, and the like. Each of databases 309, 311, 312, 313 may or may not be a conventional database, and instead may refer to data stored in a memory, accessed as needed by the server software. For example, user database 313 may in fact be a collection of multiple databases or database tables.

Features described herein may be used with or in a variety of video games, including but not limited to, WORLD OF TANKS® by Wargaming.net®. Aspects described herein may also be used with other video games and are not limited to any one genre or implementation. Aspects described herein may be implemented in video game application software stored on a computer readable medium, e.g., storage 201, 203, 205, 206, 213, 215, 309, 311 312, and/or 313, and executable by a data processing device.

Various aspects of the disclosure provide features and capabilities that may enhance game play by providing capabilities that users may utilize to play the video game. According to various aspects described herein, a video game may provide a graphically simulated virtual world or virtual environment, in which the game takes place, referred to herein interchangeably as a virtual world and as a simulated environment of the video game. The simulated environment may have features similar to actual geographic locations or may have fictional, science fiction, or fantasy-themed environments.

FIG. 4 illustrates a block diagram of a video game software application 401. Each block in FIG. 4 illustrates a logical software module or function that performs an action, provides a capability or feature, implements an object, or performs some other aspect of the video game. When the video game software 401 executes on a data processing system such as a PC or game console, the modules operate collectively to provide a video game experience to a player. The modules illustrated in FIG. 4 are illustrative only, and additional or different modules may be used. The same, additional or different modules may be executed in tandem on a server with which each client device is connected.

Video game software 401 may include, e.g., a game manager module 402, which manages the overall operation of the video game and may be the initial module launched when the video game is executed. Video game software 401 may also include a network module 403, which manages network games sessions and communication with one or more game servers. A network game session may include e.g., a cooperative campaign with other networked players, or other compartmentalized periods of game play involving players located at discrete network locations. A memory manager module 409 performs memory management during execution of the video game 401. An input module 404 may receive and interpret user input via a game controller, keyboard, mouse, and the like, and provide the interpreted commands to game manager 402, network module 403, or other applicable module. UI module 405 may manage and control the user interface, including the display displayed on the video output device, interpreting input via the input module 404, and providing audio output via audio module 408.

Various software modules may operate with one or more classes or objects defined and used in the video game 401. The classes and objects may be defined with reference to an object module 410, and may include portions of executable software code and/or one or more data structures, depending on the object. Each object may be rendered and simulated in the virtual world in accordance with a physics engine 407. Video game software 401 may include other software modules 411 as needed. FIG. 4 illustrates one possible software architecture. Others may be used. Each module depicted in FIG. 4 may communicate directly or indirectly with each other module, e.g., by passing objects, data, parameters, input, and output, etc.

A first class of in-game objects may define characters in the video game. Characters may be defined by various attributes associated with the character, e.g., name, physical appearance, skills, etc. Skills may be defined based on a character's genre or task, e.g., gunners, tank commanders, and drivers in the present example. A gunner may have skills such as aiming accuracy and aiming speed, a tank commander may have skills that regulate the overall efficiency of the tank crew, a driver may have skills that determine the vehicle speed or precision of direction. Additional character attributes may include one or more other skills that can improve performance of the character or vehicle so as to enhance the strategic gaming experience such as firefighting skills, the ability to repair vehicles, the ability to camouflage vehicles, and the like.

A second class of in-game objects may define vehicles in the video game. A vehicle may be defined as any simulated inanimate object directly or indirectly controllable by or dependent on an in-game character or user/player. Illustrative vehicles may include tanks, airplanes, ships (and/or submarines), and the like. Vehicles may have various attributes and functions that provide advantageous qualities to the vehicle during combat. For example, some vehicles might be fast with minimal firepower, whereas other vehicles may be slower but extremely powerful. Infinite variations of strength, speed, defense, and any other attribute are possible.

Object module 410 may provide an array of vehicles, vehicle components, characters and other equipment. Vehicles, vehicle components, characters and other equipment may be defined by one or more objects and instantiated during the game. Each object may have various attributes and functions and provide advantages and disadvantages based thereon. A vehicle component may refer to an upgradeable component of a vehicle, e.g., armor plating, engine, guns, etc.

FIG. 5A illustrates a block diagram of an instance 501 of a character object. Object instance 501 has an object class 505 (Character). Instance 501 may acquire one or more attributes from the object class. Attributes 507, when examined, define a state of the instance. In this example, the Character has the following attributes: Name 511, Qualification 512, Training Level 513, and Competence 514. A character may also have additional skill types 509. Additional skill types may include Repair Skills 515, Firefighting skills 516, and Camouflage skills 517. Other skill types, attributes, etc., may also or alternatively be used.

Each attribute may have a particular value. The attribute may have a default value inherited from the Qualification type 512. For some attributes, a player may increase attribute value by allocating experience points, gained during gameplay, to the character. Increased attribute value enhances gameplay by improving performance of the vehicle containing the characters. For example, by allocating experience points to the gunner of a tank, the Training Level 513 may be increased resulting in more accurate gun pointing by a vehicle containing that character, leading to improved vehicle performance during battle. Similarly, the effectiveness of the additional skill types is increased in accordance with the value of the skill. Thus, for example, a Firefighting skill 516 value of 100% is proportionally more effective than a value of 50%. Increased firefighting effectiveness results in reduced damage to the vehicle in the event of a fire. By staffing a vehicle with characters having improved attributes and skills, vehicle performance is maximized allowing for a more effective performance during game play.

In some embodiments, attributes might not be able to be changed. Qualification 512 may not be changed; for example, a driver may not be retrained as a gunner. A character's Competence attribute 514 refers to their ability to operate a specific vehicle type; for example a specific type of tank such as the M3 Stuart tank. Competence 514 may be changed by retraining the character to operate the same Qualification 512 on a different vehicle. Changing Competence 514 may result in a decreased Training Level 513 in the new vehicle. Additional experience points may be used to raise the Training Level 513 in the new vehicle. A character may eventually be associated with multiple competence attributes—one per vehicle the character has been associated with.

FIG. 5B illustrates a block diagram of an instance 551 of a vehicle object. Object instance 551 has an object class 555 (Vehicle). Instance 551 may acquire one or more attributes 557 from the object class. Attributes 557, when examined, define a state of the instance. In this example, object instance 551 is a Liechttraktor Tank and has attributes associated with tank properties. Exemplary attributes include Name 561, Hit Points 563, Weight/Load limit 564, Engine Power (h.p.) 565, Speed Limit 566, Hull Armor 567, Turret Armor 568, Standard Shell Damage 569, Standard Shell Penetration 570, Rate of Fire 571, Turret Traverse Speed 572, View Range 573, and Signal Range 574. These attributes contribute to the vehicle's effectiveness in combat. Attribute types may also have an attribute value, which determines the effectiveness of the attribute function. For example, the Speed Limit attribute 566 has a value of 46 km/h, which indicates how fast the vehicle can travel. One or more of the attributes, alone or in combination, may be used to assign the vehicle to a subclass. In this example, vehicle 551 may be in a subclass of tanks referred to as "Light Tanks" based on hit points, speed, armor, etc. Other classes of tanks may include medium tanks and heavy tanks, among others. Subclass may be used to quickly identify to a user a general approximation of attributes associated with a vehicle without requiring the user to review each attribute in detail.

Some aspects of the disclosure involve providing a user with different views of a virtual world or three-dimensional simulated environment. Additional and/or alternative aspects of the disclosure also include providing the user with additional information or interactive controls in the different views of the environment and gameplay information.

A player or user can provide input to manipulate or control an object in a virtual world or three-dimensional simulated environment or change views of the virtual world or simulated environment through the input module 404 of video game software 401 which can communicate with a virtual world server 300 such as a virtual environment server 105. The input module 404 can pass the user input to the other modules including the UI module 405 to cause changes in the environment or views to be displayed on a display device in response to the user input. Through manipulation of an object in the environment such as a vehicle or character, the user can interact with the simulated environment and view different portions of the environment. The user can further view the environment through a number of different viewpoints and viewing ranges including a first-person view and a third-person view, and the user can change between different viewing modes and/or viewpoints. For example, if the controlled object is a tank vehicle, the player's point of view may be a first-person view from the viewpoint of a character located in the vehicle or a third-person view from a point a short distance behind the user controlled character or vehicle. The distance for the third-person view from behind the user controlled character or vehicle can vary depending on the terrain and viewing modes. In some instances, the direction of the player's view of the environment may be controlled together with the direction in which a weapon is aimed. In other instances, the direction of the player's view of the environment may also be changed independently of the direction of a weapon. The player can further control the character or vehicle independently of the direction of the view such that the forward direction for a player's character or vehicle may be in a direction different than the direction of the view being displayed.

Various examples described throughout this disclosure will be described in terms of a user or player touching or pressing onto a control. Such embodiments may include a device with a touch screen that allows a user or player to press his or her finger (or a stylus or other item that can be detected by a touch sensor of the touch screen) onto the touch screen to provide touch and/or gesture input. When terms such as touch, press, or gesture are used, it can be understood that the computing device is detecting the touch and/or gesture input via one or more touch sensors and/or one or more processors of the computing device. For example, one or more touch sensors may detect a user's touch and provide a signal to the one or more processors representing the touch. The one or more processors may process the signal to determine a location of the touch and/or a direction of the touch. Based on one or more signals received from the touch sensor, the one or more processors may determine that a gesture is being performed by the user (e.g., the user may be swiping or dragging his or her finger across the touch screen). Software, such as the video game application (see e.g., FIG. 4), may have access to the touch and/or gesture input (e.g., via the operating system of the device) and may perform additional processing to interpret the touch and/or gesture input. Some instances may include processing the touch and/or gesture input based on a user interface being displayed to the user and responding to the touch and/or gesture input by updating the user interface and/or controlling an object of the virtual world).

The various examples described throughout this disclosure are not meant to be limited to a touch screen device or a similar device with a touch sensor. Aspects of the disclosure may be used in a device that has a display screen and a different input device, such as a keyboard or mouse.

Having discussed several examples of a network environment, virtual world client, and virtual world server that may be used in implementing various aspects of the disclosure, as well as several examples of software modules, character objects, and vehicle objects that may be used in accordance with various aspects of the disclosure, a number of embodiments will now be discussed in greater detail. In particular, and as introduced above, some aspects of the disclosure generally relate to providing enhanced game mechanics. In the description below, various examples illustrating how such game mechanics may be provided in accordance with one or more illustrative embodiments will be discussed.

Figure 6:
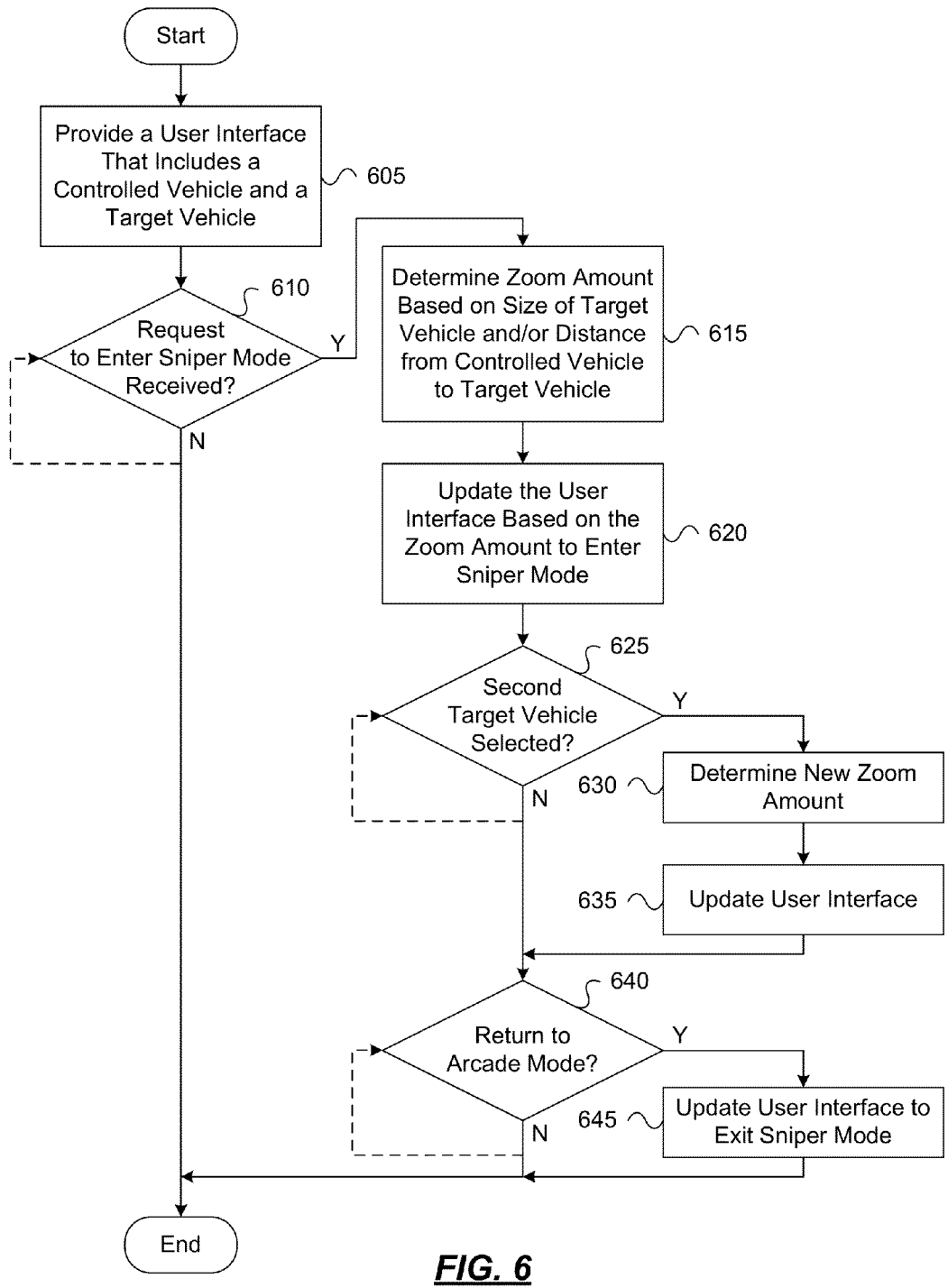
FIG. 6 depicts a flowchart that illustrates a method of dynamically determining and applying a zoom amount when entering a sniper mode in accordance with one or more illustrative aspects discussed herein.

FIG. 6 depicts a flowchart that illustrates a method of dynamically determining and applying a zoom amount when entering a sniper mode in accordance with one or more illustrative aspects discussed herein. In one or more embodiments, the method illustrated in FIG. 6 and/or one or more steps thereof may be performed by a computing device (e.g., client device 200, server 300, etc.). In other embodiments, the method illustrated in FIG. 6 and/or one or more steps thereof may be embodied in computer-executable instructions that are stored in a computer-readable medium, such as a non-transitory computer-readable memory.

As seen in FIG. 6, the method may begin in step 605, in which a user interface that includes a controlled vehicle and a target vehicle may be provided. For example, in step 605, a computing device may provide a user interface that includes a controlled vehicle and a target vehicle. In providing such a user interface, the computing device may, for instance, display the user interface and/or cause the user interface to be displayed on one or more display devices. For instance, the computing device may render and/or otherwise generate the user interface and subsequently cause the user interface to be displayed on one or more display devices that may be connected to and/or otherwise communicatively coupled to the computing device. While several of the examples discussed below involve presenting a user interface that includes both a controlled vehicle and a target vehicle, a user interface that does not include a target vehicle (and which, e.g., only includes a controlled vehicle) also may be provided in some instances. In such instances, a zoom amount may, for example, be determined and applied even if there are no target vehicles (e.g., enemy vehicles) within the user's field of view (which may, e.g., also be referred to as the player's field of view), as discussed in greater detail below.

In one or more arrangements, the computing device (which may, e.g., be performing step 605 and/or executing the method illustrated in FIG. 6) may be a tablet computer or other mobile computing device that includes one or more touch-sensitive display screens, and the user interface may be generated, rendered, and displayed by the computing device on such a display screen. Such an arrangement may, for instance, enable a user of the computing device to view the user interface on the display screen and also interact with the user interface by touching the display screen. In addition, the user interface may be provided in connection with a video game that is being executed on the computing device and/or played by the user of the computing device. For example, the user interface may be provided in connection with an MMO game in which the user of the computing device controls the controlled vehicle. The target vehicle may, for instance, be controlled by another player (who may, e.g., be using a different computing device) or may be a computer controlled "bot" (which may, e.g., be controlled by the computing device executing the method illustrated in FIG. 6 or by one or more other computing devices, such as one or more computer servers that may provide the MMO game). While many of the examples discussed herein involve "vehicles," such as a controlled vehicle and a target vehicle, the "vehicles" may, in some embodiments, encompass any kind of in-game objects, such as characters, avatars, humanoids, animals, plants, creatures, inanimate objects, and/or the like.

In some embodiments, the user interface may include an arcade view of the controlled vehicle and the target vehicle before the request to enter the sniper mode is received, where the arcade view is configured to provide a third-person perspective of the controlled vehicle and the target vehicle, and where the sniper mode is configured to provide a first-person perspective of the target vehicle from the controlled vehicle. For example, the arcade view (which may interchangeable by referred to as an "arcade mode") may provide a third-person perspective, centered on the controlled vehicle, of a virtual world that includes the controlled vehicle. Thus, the arcade view may provide a view of both the controlled vehicle and at least a portion of the controlled vehicle's surroundings in the virtual world (which may, e.g., include the target vehicle). On the other hand, the sniper mode (which may interchangeably be referred to as a "sniper view") may provide a first-person perspective, from the standpoint of the controlled vehicle, of at least a portion of the surroundings of the controlled vehicle in the virtual world. In addition, the sniper view may, for example, provide a magnified view of the first-person perspective of the controlled vehicle. Additionally, and as discussed below, different magnification levels may be available in the sniper mode. For example, the computing device may, in some instances, determine an appropriate magnification level for the sniper mode based on various factors, including the distance to the target vehicle and the size of the target vehicle. In some instances, the computing device might determine the magnification level based only on the distance to the target vehicle (and, e.g., without regard to the size of the target vehicle). Additionally or alternatively, the magnification level used in the sniper mode may be manually controlled by the user and/or subject to one or more constraints (which may, e.g., set a maximum amount of magnification that may be applied in the sniper mode based on one or more factors, including user customization settings, vehicle customization settings, etc.).

In step 610, it may be determined whether a request to enter a sniper mode has been received. For example, in step 610, the computing device may determine whether a request to enter a sniper mode has been received. In some instances, such a request may be received as user input (e.g., as a click, tap, or other selection of a control presented on the user interface; as a pressing or other interaction with a physical button on the device itself; etc.). In other instances, the computing device may determine to automatically enter the sniper mode based on receiving a user selection of a particular gun, weapon, or other feature or mode. Additionally or alternatively, the computing device may determine to automatically enter the sniper mode based on the presence of one or more particular targets and/or types of targets within the virtual world, such as the presence of one or more airborne targets, the presence of one or more targets that are beyond a predetermined distance from the controlled vehicle within the virtual world, and/or the presence of one or more other types of targets. In these instances, the request to enter the sniper mode that may be received in step 610 may be generated by the computing device itself in response to determining to automatically enter the sniper mode.

If it is determined, in step 610, that a request to enter the sniper mode has not been received, then the method may end. Alternatively, the method may continue executing in a loop and other processing may continue as well. For example, the user interface may remain in an arcade mode and/or otherwise continue providing a third-person view of the virtual world. In addition, other processing of user input (e.g., receiving and processing user input moving and/or otherwise controlling the vehicle, the camera, and/or viewing angle, etc.) may continue, and the computing device may render and/or update the user interface accordingly. Additionally or alternatively, the computing device may periodically reevaluate whether a request to enter the sniper mode has been received.

Alternatively, if it is determined, in step 610, that a request to enter the sniper mode has been received, then in step 615, a zoom amount may be determined based on a size of the target vehicle and a distance from the controlled vehicle to the target vehicle. For example, in step 615, in response to receiving the request to enter the sniper mode, the computing device may determine a zoom amount based on a size of the target vehicle and a distance from the controlled vehicle to the target vehicle. In one or more arrangements, the zoom amount may, for instance, define a level of magnification (which may, e.g., also be referred to as a "magnification level") to be used in presenting the first-person view of the virtual world in the sniper mode. For example, one zoom amount that is greater than another zoom amount will result in a relatively higher level of magnification, thus allowing objects that are relatively farther away from the controlled object within the virtual world to be displayed at a relatively greater level of magnification, and thus, at a greater size within the rendered and/or displayed user interface. In some additional and/or alternative arrangements, a zoom amount may be determined based only on the distance from the controlled vehicle to the target vehicle. In these arrangements, the computing device may, in step 615, determine a zoom amount based only on the distance from the controlled vehicle to the target vehicle within the virtual world, for example.

In some instances, in determining a zoom amount (e.g., in step 615), the computing device first may determine the size of the target vehicle and/or the distance from the controlled vehicle to the target vehicle in the virtual world (e.g., by accessing one or more virtual world objects and/or instances of such objects). For example, in determining the size of the target vehicle, the computing device may access and/or load information about the target vehicle, which may be defined by the target vehicle's class. For instance, different vehicles may be instances of the same class and/or different classes, and different vehicles also may have different attributes that may specify the size of the target vehicle and/or other properties of the target vehicle (e.g., as discussed above with respect to FIGS. 5A and 5B) that may, in some instances, be used by the computing device to calculate, derive, and/or otherwise determine the size of the target vehicle. Additionally, in determining the distance from the controlled vehicle to the target vehicle, the computing device may calculate this distance by computing the Euclidian distance between two points, where each point represents one of the controlled vehicle and the target vehicle (e.g., as expressed in virtual world coordinates which may correspond to points along the X, Y, and Z axes within the three-dimensional space of the virtual world), using, for instance, a square root method.

In some instances, in determining a zoom amount (e.g., in step 615), a zoom amount may be selected from a table of possible and/or predefined zoom amounts based on the size of the target vehicle and/or the distance from the controlled vehicle to the target vehicle. For example, different zoom amounts may be defined in a table or other resource for different vehicle sizes and/or distances, and a particular zoom amount may be selected based on the size of the target vehicle and/or the distance to the target vehicle being equal to or falling into a range associated with one of the predefined zoom amounts. In other instances, in determining a zoom amount (e.g., in step 615), a ratio may be used, such that the selected and/or determined zoom amount causes the target vehicle to be rendered and/or displayed at a certain size relative to a reticle. Such a reticle may, for example, be an aiming assistance construct that is included in and/or displayed on the user interface during the sniper mode and that may, for example, include one or more line segments and/or indicators (which may, e.g., assist the user in aiming one or more guns and/or other weapons of the controlled vehicle, as discussed in greater detail below). In instances in which a ratio is used in determining the zoom amount (e.g., in step 615), the zoom amount may thus be determined to be a magnification level that causes the target vehicle to appear with dimensions at specific proportion(s) to the dimensions of the reticle (e.g., one-fourth the height of the reticle and/or one-fourth the width of the reticle). In other instances, in determining a zoom amount (e.g., in step 615), a default zoom amount may be selected regardless of any other factors and/or criteria. Such a default zoom amount may be used in some instances if, for instance, one or more errors occur (e.g., if the size of the target vehicle and/or the distance to the target vehicle cannot be determined, if there is no target and the user has simply requested to enter the sniper mode even though no target vehicle or other targets are present, etc.). For example, a default zoom amount may be used if there is no enemy vehicle or other target vehicle in the controlled vehicle's field of view and/or in the user's field of view.

In step 620, the user interface may be updated based on the zoom amount to enter the sniper mode. For example, in step 620, the computing device may update the user interface based on the zoom amount determined in step 615 in order to enter the sniper mode. In updating the user interface, the computing device may, for instance, redraw, render, and/or display the user interface to switch from the third-person view of the virtual world in the arcade mode to the first-person view of the sniper mode. In addition to displaying the first-person view of at least a portion of the surroundings of the controlled object within the virtual world, the computing device also may, for example, present a magnified view of such surroundings, where the amount of magnification and/or level of magnification corresponds to the zoom amount determined in step 615. In this way, the sniper mode may enable a user of the computing device (who may, for instance, be controlling the controlled vehicle) to be presented with (and, e.g., thereby view) a magnified view of the virtual world surroundings (which may, e.g., include the target vehicle). In addition, the computing device may be configured to allow the user to manually increase and/or decrease the magnification amount and/or the magnification level within the sniper mode to zoom in and/or out on various objects. The computing device may be further configured to allow the user to move the view within the sniper mode vertically (e.g., to look up and down in the virtual world) and/or horizontally (e.g., to look from side to side in the virtual world).

In some embodiments, after entering the sniper mode, the zoom amount used when initially entering the sniper mode may be maintained as one or more virtual world characteristics change. For example, after entering the sniper mode in step 620, the computing device may maintain and/or otherwise continue to apply the zoom amount determined in step 615, even as virtual world characteristics (e.g., the position, direction, and/or speed of the controlled vehicle; the position, direction, and/or speed of the target vehicle; and/or other circumstances) change within the virtual world as time elapses. For instance, if the target vehicle (e.g., an enemy vehicle) hides behind an object in the virtual world (e.g., relative to the controlled vehicle), the computing device may maintain and/or otherwise continue to apply the zoom amount, which may result in the user interface presenting a magnified view of the object itself (e.g., instead of the target vehicle, which may be hiding behind the object). As another example, if the target vehicle (e.g., the enemy vehicle) moves out of the portion of the virtual world presented in the user interface and/or otherwise disappears from the screen, the computing device may maintain and/or otherwise continue to apply the zoom amount, until substantial user input (e.g., user input moving the camera and/or otherwise changing the field of view beyond a certain threshold amount) is received. By maintaining the zoom amount in these and/or other ways, the usability of a video game incorporating these features may be enhanced, as the user may be able to more easily and intuitively interact with the user interface after the sniper mode is entered.

In some embodiments, updating the user interface may include displaying a reticle and displaying the target vehicle at a first magnification level based on the determined zoom amount. For example, in updating the user interface in step 620, the computing device may draw, render, and/or display a reticle in the user interface, and the reticle may be configured to assist a user in aiming one or more guns and/or other weapons of the controlled vehicle (e.g., at a target vehicle, while in the sniper mode). In addition, the computing device may draw, render, and/or display the target vehicle (or at least a portion of the target vehicle and/or other virtual world surroundings of the controlled vehicle) at a specific magnification level corresponding to the zoom amount determined in step 615. In this way, a user may be able to better view the target vehicle in the sniper mode (e.g., as a result of the magnification provided based on the determined zoom amount) and aim one or more guns and/or other weapons of the controlled vehicle at the target vehicle while in the sniper mode. Additionally, in some arrangements, different magnification levels may be provided in incremental amounts of magnification, and in displaying the virtual world surroundings of the controlled vehicle at a given magnification level, the determined zoom amount may be rounded to the nearest magnification level, which may, for example, then be used in updating the user interface in step 620. For example, magnification levels may be provided in 0.5× increments, such that available magnification levels may include 1.5×, 2.0×, 2.5×, etc., and a determined zoom amount may be rounded to the nearest of these available magnification levels, thus allowing the virtual world surroundings of the controlled vehicle to be displayed at one of these magnification levels.

Additionally or alternatively, the magnification level (which may, e.g., be used in updating the user interface in step 620) may be dynamically adjusted based on the distance to the target vehicle and/or changes in the distance between the controlled vehicle and the target vehicle (e.g., as time elapses). In some instances, dynamic adjustments to the magnification level may be made based on field of view (e.g., the field of view being presented in the user interface by the computing device). For example, minimum and maximum field of view angles that depend on the distance to the target vehicle may be defined and subsequently used (e.g., by the computing device) in dynamically adjusting and/or otherwise updating the magnification level based on the field of view.

In some embodiments, updating the user interface may further include receiving user input aiming the reticle at the target vehicle, and in response to receiving the user input aiming the reticle at the target vehicle, displaying the target vehicle at a second magnification level greater than the first magnification level. For example, in updating the user interface in step 620, the computing device may further receive additional user input aiming the reticle at the target vehicle (e.g., user input moving the reticle from a point that includes virtual world surroundings other than the target vehicle to a point that does include at least a portion of the target vehicle). Additionally, in response to receiving this input, the computing device may display the target vehicle at a different, and potentially greater, level of magnification (e.g., thereby increasing or otherwise modifying the amount of magnification already being applied in the sniper mode). This dynamic modification in the amount of magnification may, for instance, result in the user interface providing an "auto zoom" or "smart zoom" functionality based on the targeting of the target vehicle while in the sniper mode, which may allow a user of the computing device to more easily target an enemy vehicle and/or otherwise use the sniper mode that is provided with the video game. In other words, in providing this auto-zoom functionality, the computing device may increase and/or otherwise adjust the zoom amount after aiming at and/or locking onto a target vehicle while in sniper mode. The computing device may increase the zoom amount in this manner, for instance, responsive to receiving user input targeting a particular vehicle, locking onto the targeted vehicle, and subsequently increasing or otherwise adjusting the magnification provided in the sniper mode based on the lock. In this way, the dynamic modification in the amount of magnification may, in some instances, depend both on user input (which may, e.g., control and/or define the positioning of the controlled vehicle) and on the position of the target vehicle.

In step 625, it may be determined whether a selection of a second target vehicle has been received. For example, in step 625, the computing device may determine whether a second target vehicle (e.g., different from the target vehicle for which the zoom amount was determined in step 615) has been selected while the sniper mode is active. In some instances, such a selection may be received by the computing device as user input (e.g., a click, tap, or other direct selection of another target vehicle included in the virtual world). In other instances, such a selection may be received by the computing device as a result of the user moving the camera, moving the reticle, and/or otherwise aiming at another target vehicle that may be included in the surroundings of the controlled vehicle within the virtual world.

If it is determined, in step 625, that a selection of a second target vehicle has not been received, then the method may end. Alternatively, the method may continue executing in a loop and other processing may continue as well. For example, the user interface may remain in the sniper mode, and other processing of user input (e.g., receiving and processing user input moving and/or otherwise controlling the vehicle, the camera, and/or the viewing angle, etc.) may continue. In addition, the computing device may render and/or update the user interface accordingly. Additionally or alternatively, the computing device may periodically reevaluate whether a new and/or different target vehicle has been selected.

Alternatively, if it is determined, in step 625, that a selection of a second target vehicle has been received, then in step 630, a new zoom amount may be determined based on the size of the second target vehicle and the distance from the controlled vehicle to the second target vehicle. For example, in step 630, the computing device may determine a new zoom amount to be used in presenting a magnified view of the second target vehicle. The new zoom amount may, for instance, be determined in a similar manner to how such a zoom amount may be determined in step 615 above (e.g., a default zoom amount may be used; a zoom amount may be selected from one or more predefined zoom amounts based on the size of the second target vehicle and/or the distance from the controlled vehicle to the second target vehicle; and/or a ratio may be used in calculating the new zoom amount).

In step 635, the user interface may be updated based on the new zoom amount. For example, in step 635, the computing device may redraw, render, and/or display the user interface to present a magnified view of the virtual world surroundings of the controlled vehicle (which may, e.g., include the target vehicle), where the amount of magnification and/or the level of magnification corresponds to the zoom amount determined in step 630. In this way, the computing device may dynamically determine and apply a zoom amount in the sniper mode in response to a selection of a target vehicle (e.g., the second target vehicle in this example). Stated differently, the computing device may adjust a zoom amount or magnification level after locking onto a target vehicle while the sniper mode is active (e.g., where the aim of one or more guns and/or other weapons of the controlled vehicle are locked onto the target vehicle based on the computing device receiving a selection of the target vehicle, for instance, in step 625).

In step 640, it may be determined whether a request to return to an arcade view has been received. For example, in step 640, the computing device may determine whether a request to return to the arcade mode has been received. In some instances, such a request may be received as user input (e.g., as a click, tap, or other selection of a control presented on the user interface; as a pressing or other interaction with a physical button on the device itself; etc.). In other instances, the computing device may determine to automatically exit the sniper mode and/or return to the arcade mode based on the destruction of a target vehicle (e.g., a target vehicle onto which one or more guns and/or other weapons of the controlled vehicle were previously locked). In these instances, the request to return to the arcade mode that may be received in step 640 may be generated by the computing device itself in response to determining to automatically exit the sniper mode and/or return to the arcade mode.

If it is determined, in step 640, that a request to return to the arcade view has not been received, then the method may end. Alternatively, the method may continue executing in a loop and other processing may continue as well. For example, the user interface may remain in the sniper mode and/or otherwise continue providing a first-person view of the virtual world. In addition, other processing of user input (e.g., receiving and processing user input moving and/or otherwise controlling the vehicle, the camera, and/or the viewing angle, etc.) may continue, and the computing device may render and/or update the user interface accordingly. Additionally or alternatively, the computing device may periodically reevaluate whether a request to return to the arcade view has been received.

Alternatively, if it is determined, in step 640, that a request to return to the arcade view has been received, then in step 645, the user interface may be updated to exit the sniper mode. For example, in step 645, the computing device may update the user interface to exit the sniper mode in response to receiving the request to return to the arcade view. In updating the user interface in this manner, the computing device may, for instance, redraw, render, and/or display the user interface to switch from the sniper mode and/or a first-person view to the arcade mode and/or a third-person view.

Subsequently, the method may end. Additionally or alternatively, the method may continue in a loop while other processing (which may, e.g., be associated with execution of the video game) may be performed.

In some embodiments, determining a zoom amount (e.g., in step 615 and/or in step 630 of the example method discussed above) may include calculating the zoom amount to provide at least one predefined margin within a reticle included in a reticle portion of the user interface, where the at least one predefined margin provides a predefined amount of space between the target vehicle and at least one edge of the reticle. For example, in determining the zoom amount in step 615 or step 630, the computing device may calculate a zoom amount that will provide one or more predefined margins between an outline of the target vehicle and corresponding edges of the reticle portion of the user interface. The predefined margins may, for instance, be defined as a predetermined number of pixels (e.g., 10 pixels, 20 pixels, etc.), a predefined percentage of the width and/or height of the reticle portion of the user interface (e.g., 10 percent, 20 percent, etc.), and/or in other absolute or relative units. In this way, the reticle itself may serve as a reference for determining the amount of magnification to be applied when entering the sniper mode (e.g., in step 620).

In some embodiments in which the zoom amount is calculated to provide one or more predefined margins, the zoom amount may be determined to be less than a predefined maximum zoom amount. For example, a predefined maximum zoom amount may set a ceiling or other limit on the magnification amount and/or magnification level, which the computing device might not be able to exceed. Thus, in calculating the zoom amount to provide one or more predefined margins, the computing device may determine the zoom amount to be less than the predefined maximum zoom amount. This may, for instance, increase the difficulty of the video game and/or preserve the challenge of the video game. In addition, the predefined maximum zoom amount may, in some instances, vary based on the skill level of the player, the difficulty level selected for the game, and/or one or more other factors.

In some embodiments, a zoom amount may be determined (e.g., in step 615 and/or in step 630 of the example method discussed above) based on field of view (which may, e.g., also be referred to as FOV) and/or one or more field of view angles. For example, a minimum field of view angle and/or a maximum field of view angle may be defined and subsequently used by the computing device (e.g., in step 615, in step 630, etc.) in determining a zoom amount to be applied. Such a field of view angle may, for instance, depend on the aspect ratio of the user interface being presented and/or on the aspect ratio of the display screen on which the user interface may be displayed. Additionally or alternatively, the field of view angle may define a portion of the virtual world that is visible in such a user interface.

In some embodiments, a reticle portion of the user interface may be locked onto the target vehicle in the sniper mode, and the reticle portion of the user interface may be updated to track movement of the target vehicle while in the sniper mode. For example, in updating the user interface to enter the sniper mode (e.g., in step 620) or in updating the user interface after a new target vehicle is selected (e.g., in step 635), the computing device may lock a reticle portion of the user interface onto the target vehicle so that the reticle portion (which may, e.g., be displayed while the sniper mode is active) may track any movements of the target vehicle. This may, for instance, allow the user of the computing device to maintain the aim of the reticle (and correspondingly, one or more guns and/or other weapons of the controlled vehicle) on the target vehicle, as the controlled vehicle and/or the target vehicle move and/or otherwise change position within the virtual world. In locking the reticle onto the target vehicle, the computing device may, for instance, maintain aim of the reticle by performing one or more of the methods and/or method steps discussed below with respect to FIG. 9.

FIGS. 7A-7F depict example screenshots of video game user interfaces that may be displayed in dynamically determining and applying a zoom amount in accordance with one or more illustrative aspects discussed herein. In particular, FIGS. 7A-7F depict a series of screenshots illustrating how a video game may be switching from an arcade mode into a sniper mode, as well as how a zoom amount may be automatically and/or dynamically determined and applied when entering the sniper mode.

Figure 7A:
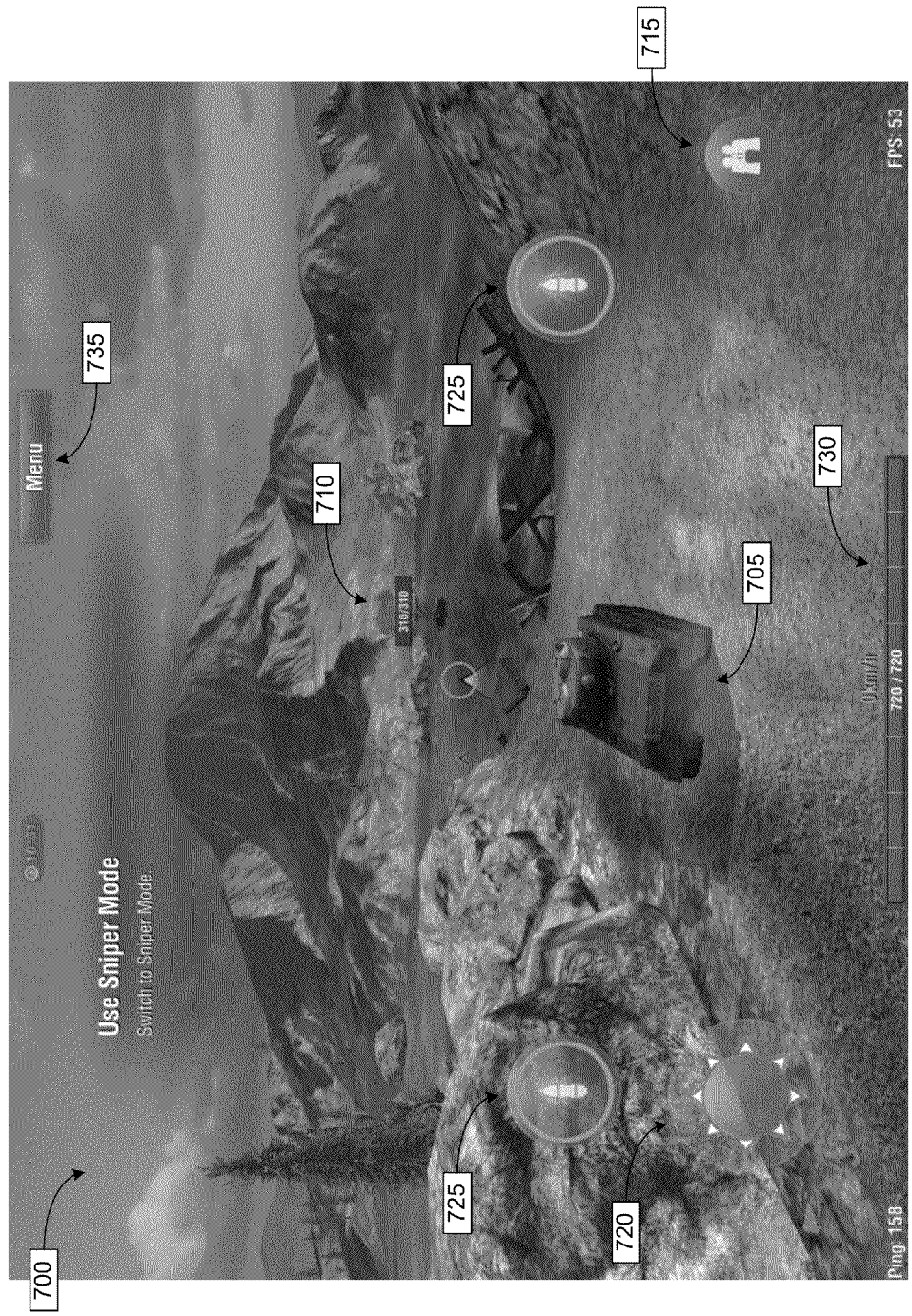

For instance, the example screenshot depicted in FIG. 7A illustrates a view of a virtual world 700 and presents user interface controls for controlling a controlled vehicle 705 included in the virtual world 700. In addition, the screenshot depicted in FIG. 7A illustrates an example of the user interface that may be provided by a computing device in performing the method discussed above with respect to FIG. 6, such as in step 605 of the example method discussed above. As seen in FIG. 7A, the virtual world 700 may include various surroundings, including a simulated terrain, as well as an enemy vehicle 710 that may be targeted by the controlled vehicle 705 and/or by a user of the computing device controlling the controlled vehicle 705. As also seen in FIG. 7A, the view of the virtual world 700 provided in this screenshot is a third-person view (e.g., an arcade mode view) of the controlled vehicle 705 and its surroundings.

In addition, the user interface presented in FIG. 7A includes various controls, including a sniper mode button 715, a joystick 720, fire buttons 725, a health indicator 730, and a menu button 735. The sniper mode button 715 may, for instance, be configured to be user-selectable to enable a user of the computing device (which may, e.g., be displaying and/or otherwise providing the video game and/or the user interface illustrated in FIG. 7A) to enter and/or exit the sniper mode. The joystick 720 may, for instance, be configured to receive directional user input to allow the user to drive and/or otherwise control the controlled vehicle 705. The fire buttons 725 may, for instance, be configured to be user-selectable to enable the user to fire one or more guns and/or other weapons of the controlled vehicle 705. The health indicator 730 may, for instance, be configured to present information about the health of and/or damage to the controlled vehicle 705. The menu button 735 may, for instance, be configured to be user-selectable to enable the user to access and/or view a menu of options and/or preferences related to the video game.

Figure 7B:
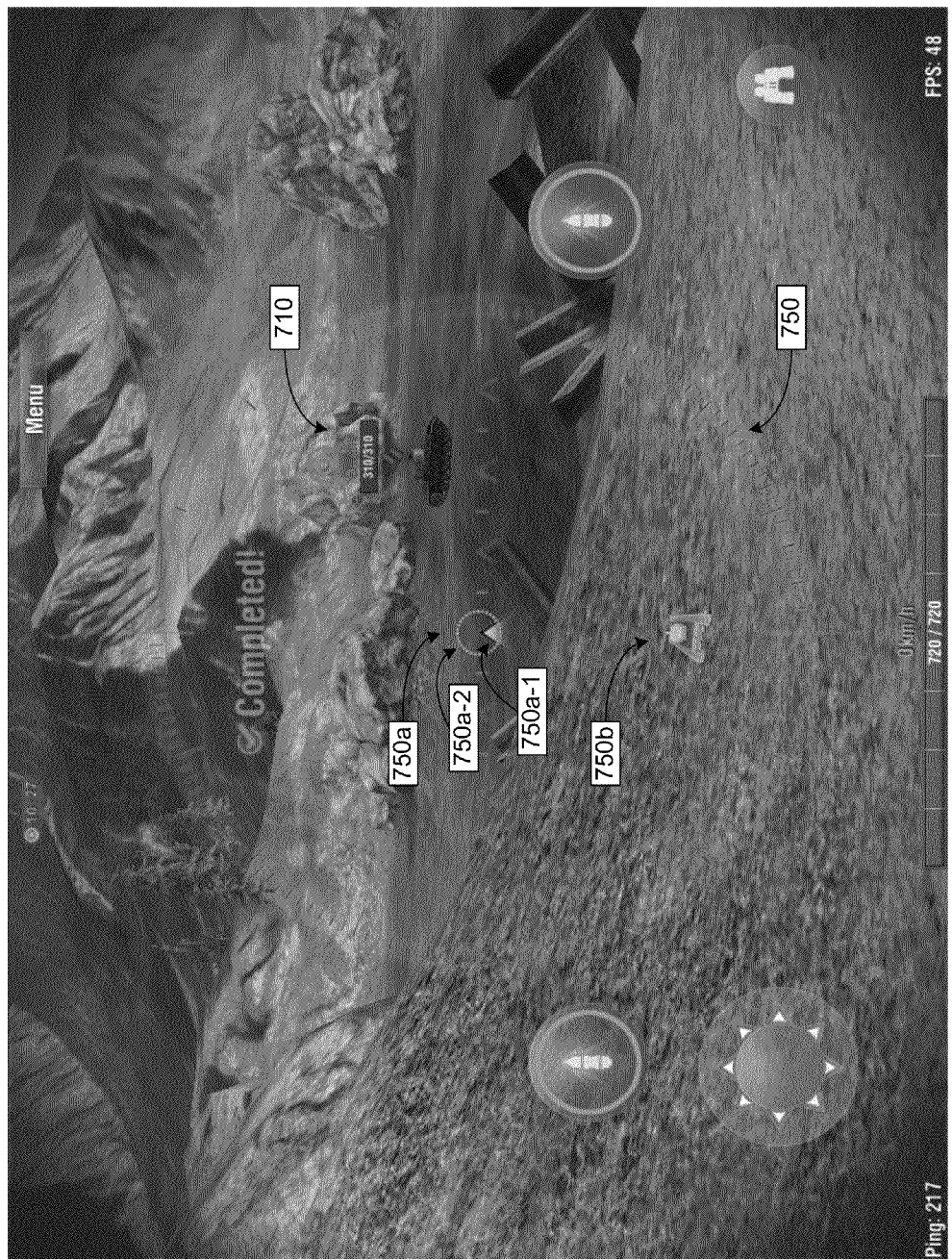

In the example screenshot depicted in FIG. 7B, the view of the virtual world 700 that is presented is a first-person view (e.g., a sniper mode view) of the surroundings of the controlled vehicle 705 from the perspective of the controlled vehicle 705 itself, as the user may have selected the sniper mode button 715 in the example user interface illustrated in FIG. 7A to enter the sniper mode, which then resulted in the display of the user interface illustrated in FIG. 7B.

As seen in FIG. 7B, in the sniper mode, a magnified view of the virtual world surroundings of the controlled vehicle 705 is presented, and thus a magnified view of target vehicle 710 is presented. The user interface illustrated in FIG. 7B also includes various user interface controls, including a reticle 750 that is configured to assist the user in aiming one or more guns and/or other weapons of the controlled vehicle 705. The reticle 750 may, in some arrangements, include a center aim portion 750a (which may, e.g., allow the user to more precisely aim one or more guns and/or other weapons at a target) and a vehicle orientation indicator 750b (which may, e.g., reflect the current position and/or orientation of the controlled vehicle relative to the view of the virtual world presented in the sniper mode). In addition, the center aim portion 750a may include both a camera marker 750a-1 (which may, e.g., indicate the direction of the camera presenting the field of view of the virtual world) and an aim marker 750a-2 (which may, e.g., indicate the direction of one or more guns and/or other weapons).

In the example screenshot depicted in FIG. 7C, the user may move the camera and/or the reticle 750 from the initial aim (shown in FIG. 7B) towards the target vehicle 710 to more closely aim at the target vehicle 710. Additionally or alternatively, the user may select the target vehicle 710 to move the aim of the camera and/or the reticle 750 onto the target vehicle 710. Once the aim of the camera and/or the reticle 750 reaches the target vehicle, a new zoom amount may be determined and applied based on the selection of the new target vehicle using the reticle 750. In this way, the user interface may, for example, provide the "auto zoom" functionality discussed above (e.g., by displaying the target vehicle at a different, greater level of magnification, based on receiving the user input aiming the reticle at the target vehicle). In other words, the example view depicted in FIG. 7C illustrates how the computing device may automatically increase the zoom amount and/or otherwise adjust the zoom amount in response to the user aiming at and/or locking onto the target vehicle while the sniper mode is active.

Figure 7D:
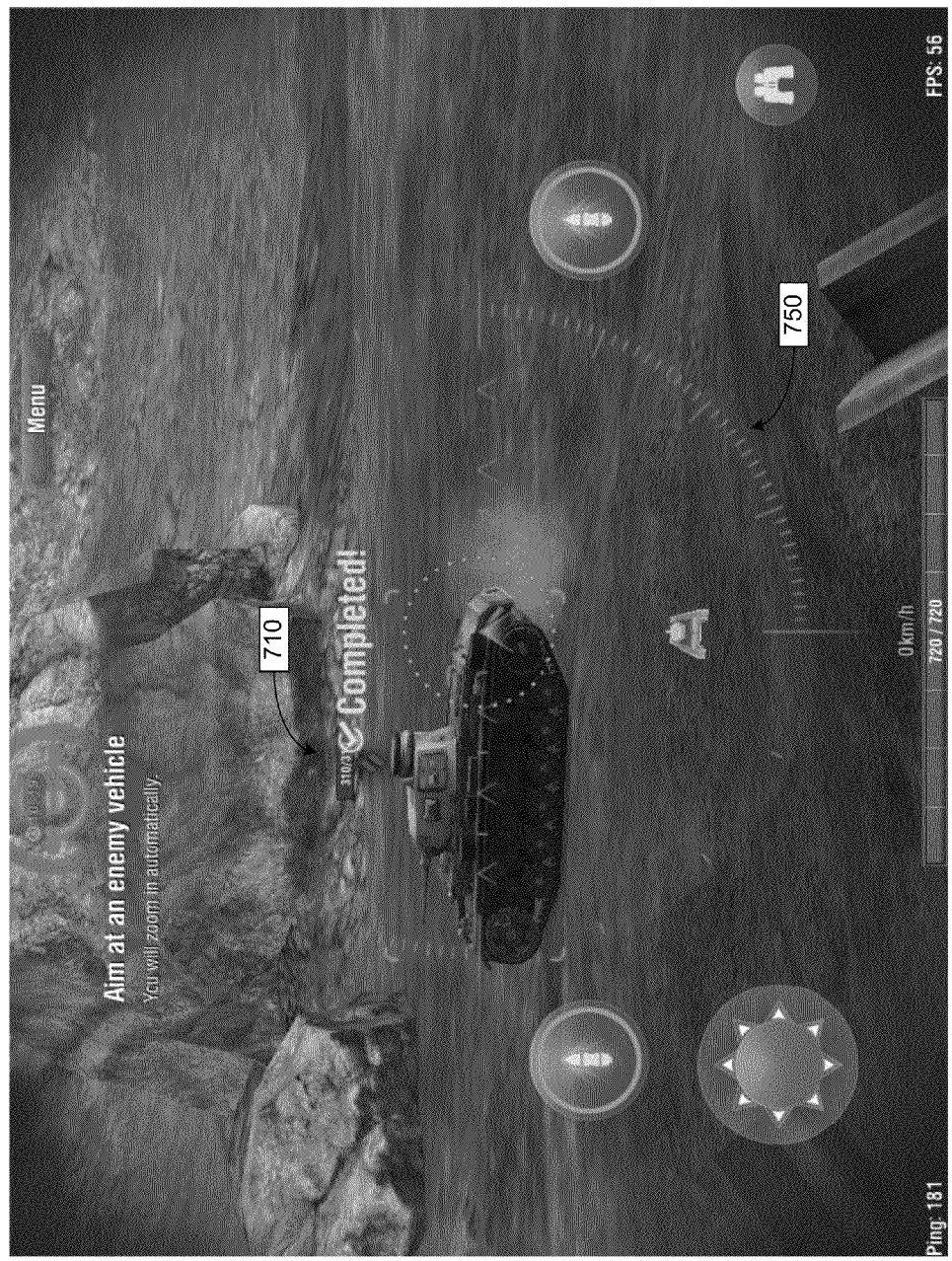

In the example screenshot depicted in FIG. 7D, the computing device may have determined and applied a new zoom amount based on the selection of the target vehicle 710 using the reticle 750, thereby resulting in a higher level of magnification than was presented in FIG. 7C.

Figure 7E:

In the example screenshot depicted in FIG. 7E, the aiming circle 750c that is included in the reticle 750 may be shrinking in size relative to the aiming circle displayed in the reticle 750 in FIG. 7D. For example, as the reticle 750 remains on the target vehicle 710 for a longer period of time and/or as the controlled vehicle remains stationary in the virtual world, the aiming circle 750c may shrink (e.g., by decreasing in radius and/or size) and, correspondingly, shots fired by the controlled vehicle within the virtual world may be given better accuracy. In this way, user interface aspects of the video game, such as the aiming circle 750c, may contribute to and/or enrich gameplay and/or user interaction with the virtual world 700.

Figure 7F:

In the example screenshot depicted in FIG. 7F, the aiming circle 750c that is included in the reticle 750 may expand after a shot is fired (e.g., by the controlled vehicle 705 at the target vehicle 710). Additionally, the aiming circle 750c may begin shrinking again as time elapses and/or as the controlled vehicle remains stationary in the virtual world.

FIGS. 8A-8F depict example screenshots of video game user interfaces that may be displayed in determining and applying a new zoom amount after another target vehicle is selected in accordance with one or more illustrative aspects discussed herein. In particular, FIGS. 8A-8F depict a series of screenshots illustrating how a second vehicle (which may, e.g., be different from the first, initially-selected vehicle shown in the series of screenshots discussed above) may be selected and/or targeted in the sniper mode, as well as how the magnification level may be adjusted in response to the selection and/or targeting of the second vehicle.

Figure 8A:
FIGS. 8A-8F depict example screenshots of video game user interfaces that may be displayed in determining and applying a new zoom amount after another target vehicle is selected in accordance with one or more illustrative aspects discussed herein.

For instance, the example screenshot depicted in FIG. 8A illustrates a view of the virtual world 700 from the perspective of the controlled vehicle 705 after the previously-targeted enemy vehicle 710 has been destroyed. The view illustrated in FIG. 8A remains a first-person view (e.g., sniper mode view) of the surroundings of the controlled vehicle 705 in the virtual world 700. In addition, a new enemy vehicle 805 that is included in the virtual world 700 has become visible to the controlled vehicle 705. As in the example discussed above, the user of the computing device may target the enemy vehicle 805 by providing user input to move the reticle 810 (and correspondingly, the guns and/or weapons of the controlled vehicle and/or the camera, which may, for instance, be a virtual camera that represents the view of the virtual world depicted in the user interface screenshots) towards and onto the enemy vehicle 805.

Figure 8B:

In the example screenshot depicted in FIG. 8B, the user may move the camera and the reticle 810 from the initial aim shown in FIG. 8A towards the target vehicle 805 to aim at the target vehicle 805. Additionally or alternatively, the user may select the target vehicle 805 to move the aim of the camera and/or the reticle 810 onto the target vehicle 805. Once the aim of the reticle 810 reaches the target vehicle 805, a new zoom amount may be determined and applied based on the selection of the target vehicle 805 using the reticle 810 (e.g., as discussed above with respect to steps 625, 630, and 635).

Figure 8C:
Figure 8D:
Figure 8E:

In the example screenshots depicted in FIGS. 8C-8E, the user may operate one or more guns and/or other weapons of the controlled vehicle to fire at and destroy the target vehicle 805, similar to how shots may be fired in the examples discussed above.

Figure 8F:

In the example screenshot depicted in FIG. 8F, the computing device may return to a default zoom amount and/or magnification level within the sniper mode (e.g., the zoom amount and/or magnification level presented in FIG. 8A) after the target vehicle 805 has been destroyed. Accordingly, the view presented in FIG. 8F represents a first-person, sniper mode view of the virtual world surroundings of the controlled vehicle at a decreased magnification level than presented in FIGS. 8B-8E.

Figure 9:
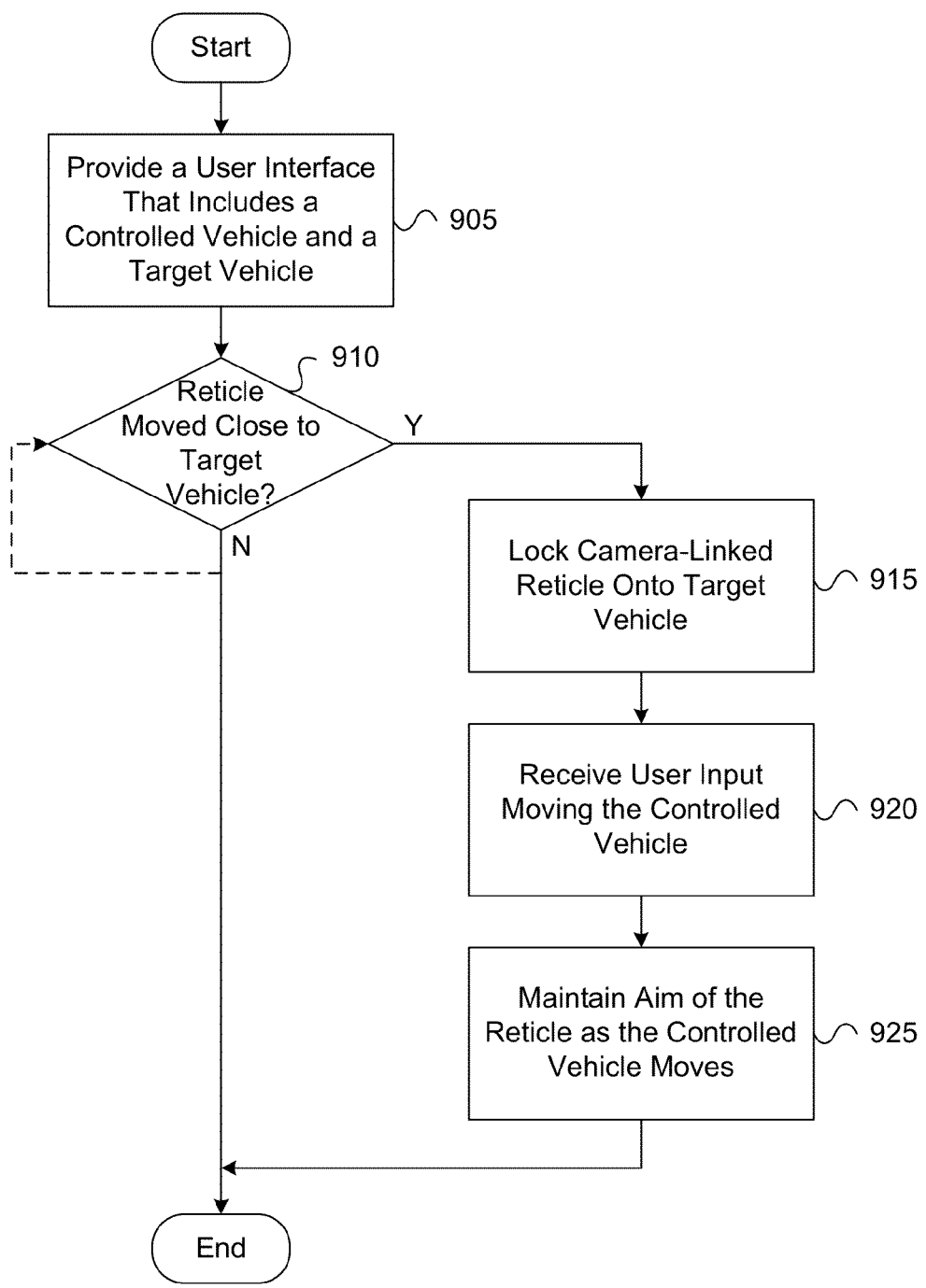
FIG. 9 depicts a flowchart that illustrates a method of dynamically locking a camera-linked reticle onto a target vehicle in accordance with one or more illustrative aspects discussed herein.

FIG. 9 depicts a flowchart that illustrates a method of dynamically locking a camera-linked reticle onto a target vehicle in accordance with one or more illustrative aspects discussed herein. In one or more embodiments, the method illustrated in FIG. 9 and/or one or more steps thereof may be performed by a computing device (e.g., client device 200, server 300, etc.). In other embodiments, the method illustrated in FIG. 9 and/or one or more steps thereof may be embodied in computer-executable instructions that are stored in a computer-readable medium, such as a non-transitory computer-readable memory.

As seen in FIG. 9, the method may begin in step 905, in which a user interface that includes a controlled vehicle and a target vehicle may be provided. For example, in step 905, a computing device may provide a user interface that includes a controlled vehicle and a target vehicle, similar to how such a user interface may be provided in step 605, as discussed above with respect to FIG. 6. For instance, the controlled vehicle may be controlled by a user of the computing device, and the user interface may present and/or otherwise include a third-person, arcade mode view of the controlled vehicle and the target vehicle. In other instances, the user interface may present and/or otherwise include a first-person, sniper mode view and/or may provide another mode or view of the virtual world.

Continuing to refer to FIG. 9, in step 910, it may be determined whether user input moving a camera-linked reticle within a predetermined distance of the target vehicle has been received. For example, in step 910, the computing device may determine whether user input (e.g., in the form of a click-and-drag operation, in the form of a direct click, tap, or other select, etc.) moving a camera-linked reticle within a predetermined distance of the target vehicle has been received.

In one or more arrangements, the reticle may be an aiming assistance construct that may be displayed on the user interface and that may, for example, include one or more line segments and/or other indicators to assist a user in aiming one or more guns and/or other weapons of the controlled vehicle at one or more targets. In some arrangements, different reticles may be displayed in different viewing modes. For example, one type of reticle may be displayed in the arcade mode, whereas another, different type of reticle may be displayed in the sniper mode. Additionally or alternatively, different reticles may be displayed for different guns and/or weapons, and the particular reticle displayed by the computing device may be modified and/or updated based on the user selecting or switching to a different gun or weapon.

In some embodiments, the camera-linked reticle may include a reticle portion of the user interface that is configured to indicate an aim of at least one gun associated with the controlled vehicle, and may be further configured to maintain a substantially constant directional relationship with a viewing angle. For example, the camera-linked reticle may be formed by one or more user interface elements (e.g., circles, lines, other indicators and/or shapes, etc.) that may be configured to indicate the aim of one or more guns and/or other weapons that may be controlled by the user and/or fired from the controlled vehicle. In addition, the camera-linked reticle may be displayed as part of the user interface such that the reticle maintains a constant or substantially constant (e.g., within 90%) relationship with the viewing angle of the virtual world presented by the user interface. In other words, the reticle may be a camera-linked reticle in that the reticle may be displayed as an overlay in a constant position on the user interface and/or display screen, even as the user and/or the computing device changes the viewing angle of the virtual world and/or the virtual world surroundings of the controlled vehicle (e.g., by zooming in or out, by panning left or right, by looking up or down, etc.). While some examples discussed herein involve a reticle being configured to indicate the aim of a gun, cannon, or other weapon that is part of and/or controlled by the controlled vehicle and/or by a user operating the controlled vehicle, a reticle may, in other instances, be configured to indicate the aim of other components that may be part of and/or controlled by the controlled vehicle, such as a periscope or other aim-able component that may be part of the controlled vehicle and/or operated by a user controlling the controlled vehicle.

In one or more arrangements, the predetermined distance (which may, e.g., be used in evaluating the decision in step 910) may be defined in terms of pixels, relative screen size, and/or other absolute units or relative units. In some instances, the distance may be measured from the center of the reticle to the center of the target vehicle (e.g., from the center of the reticle as it is included in the user interface and/or displayed on screen to the center of the target vehicle as it is included in the user interface and/or displayed on screen). In other instances, the distance may be measured from inner or outer edges of the reticle to the nearest edge of or an outer point of the target vehicle (e.g., from an inner or outer edge of the reticle as it is included in the user interface and/or displayed on screen to an edge of or outer point of the target vehicle as it is included in the user interface and/or displayed on screen). As discussed in greater detail below, the predetermined distance may be used in determining whether to lock the reticle onto a target vehicle, essentially making targets "sticky" (e.g., so that the reticle snaps to a target vehicle or other target) once the reticle is moved close enough to a target. In addition, the radius of a circle defining a "sticky" zone around a given target vehicle may, in some instances, be determined and/or may vary based on the distance from the controlled vehicle to the target vehicle. In these instances, a target vehicle that is relatively farther away from the controlled vehicle may have a smaller sticky zone, for example, than a target vehicle that is relatively closer to the controlled vehicle, such that it may be easier for the user to lock the reticle onto the target vehicle that is closer to the controlled vehicle.

If it is determined, in step 910, that user input moving a camera-linked reticle within a predetermined distance of the target vehicle has not been received, then the method may end. Alternatively, the method may continue executing in a loop and other processing may continue. For example, the computing device may continue receiving and processing user input moving and/or otherwise controlling the vehicle, the camera, the reticle, etc., and the computing device may render and/or update the user interface accordingly. Additionally or alternatively, the computing device may periodically reevaluate whether the reticle has been moved within a predetermined distance of the target vehicle or any other target vehicle or target that may be included in the user interface and/or that may be visible to the controlled vehicle and/or the user of the computing device within the virtual world.

Alternatively, if it is determined, in step 910, that user input moving a camera-linked reticle within a predetermined distance of the target vehicle has been received, then in step 915, the camera-linked reticle may be locked onto the target vehicle. For example, in step 915, in response to receiving the user input moving the camera-linked reticle within the predetermined distance of the target vehicle, the computing device may lock the camera-linked reticle onto the target vehicle.

In locking the camera-linked reticle onto the target vehicle, the computing device may automatically aim the reticle at the target vehicle (e.g., once the reticle is within a predetermined distance of and/or otherwise close enough to the target vehicle). This automatic aiming may, for instance, assist the user in aiming at the target vehicle, as the user thus might not need to manually and/or precisely line up the reticle with the target vehicle themselves. Rather, the computing device may pull the aim of the reticle onto the target so as to assist the user. In addition, once the reticle is locked onto the target vehicle, the computing device may maintain aim of the reticle on the target vehicle (e.g., until input unlocking the reticle is received, until other circumstances causing the reticle to be unlocked arise, etc.). For example, in maintaining the aim of the reticle on the target vehicle, the computing device may keep the reticle, and thus the aim of one or more guns and/or other weapons linked to the reticle, on the target vehicle, even as the controlled vehicle moves within the virtual world, even as the target vehicle moves within the virtual world, even as other input is received, and/or even as other circumstances and/or changes arise within the virtual world.

In some instances, the game mechanics that may be implemented in locking the camera-linked reticle onto the target vehicle may also depend on and/or account for the distance from the controlled vehicle to the target vehicle. For example, if the target vehicle is too far away from the controlled vehicle (e.g., at a distance exceeding a predefined threshold), then the camera-linked reticle and/or an associated camera marker may be fixed in and/or on the exact center of the target vehicle (e.g., to provide better convenience to the user). On the other hand, if the target vehicle is within a certain distance of the controlled vehicle (e.g., within a distance less than and/or specified by a predefined threshold), then the camera-linked reticle and/or an associated camera marker may be fixed at whichever point the user leaves the reticle (e.g., without automatically snapping the reticle and/or the camera marker onto the center of the target vehicle). In instances in which these features are implemented, the reticle essentially may jump toward the center of the target vehicle in certain situations (e.g., when the user moves the reticle within a predetermined distance of the target vehicle in the user interface). Such functionality may, for example, provide better convenience to the user, as once the reticle is automatically snapped to and/or locked onto the center of the target vehicle, the chances of hitting the target vehicle when firing a gun or other weapon at the target vehicle may be increased.

In step 920, user input moving the controlled vehicle from a first position to a second position may be received. For example, in step 920, after locking the camera-linked reticle on the target vehicle, the computing device may receive user input moving the controlled vehicle from a first position in the virtual world to a second position in the virtual world. In receiving such input, the computing device may, for example, receive user input (e.g., via a displayed joystick included in the user interface, via one or more buttons and/or other physical controls included in and/or coupled to the computing device, etc.) moving the controlled vehicle from one position in the virtual world to another, different position within the virtual world.

In step 925, the aim of the camera-linked reticle may be maintained on the target vehicle as the controlled vehicle moves. For example, in step 925, the computing device may maintain the aim of the camera-linked reticle on the target vehicle as the controlled vehicle moves from the first position to the second position. In maintaining the aim of the camera-linked reticle on the target vehicle as the controlled vehicle moves from one position to the other within the virtual world, the computing device may, for example, keep and/or otherwise maintain the aim of the reticle on the target vehicle by automatically updating the view to maintain the target vehicle at the center of the reticle (or substantially close to the center of the reticle) as the controlled vehicle moves between positions. Correspondingly, the direction of one or more guns and/or other weapons linked to the reticle may be similarly updated as the vehicle moves, so that if, for instance, the user fires the gun or weapon linked to the reticle while the controlled vehicle is moving, the gun or weapon will discharge in the direction of the target vehicle (e.g., as indicated by the reticle). In other words, in maintaining aim as the controlled vehicle moves, the computing device may update the viewing angle itself, since the reticle (and correspondingly, the aim of one or more guns and/or other weapons linked to the reticle)

is itself linked to the camera and is thus related to the viewing angle of the virtual world presented by the computing device.

In some instances, in maintaining the aim of the camera-linked reticle on the target vehicle, the computing device may keep the center of the reticle on the same point of the target vehicle, while in other instances, the computing device may keep the reticle on the target vehicle, but the center of the reticle may aim at different points on the target vehicle (e.g., as the controlled vehicle moves, as the target vehicle moves, etc.). For example, the computing device may, in some instances, keep the reticle center on the geometric center of the target vehicle (e.g., based on the distance between the target vehicle and the controlled vehicle exceeding a predetermined threshold amount). In other instances, the reticle center may substantially track the target vehicle, but might not always point at the geometric center of the target vehicle (e.g., depending on the speed and/or direction of motion of the controlled vehicle, depending on the speed and/or direction of the target vehicle, depending on the time elapsed since one or more guns and/or other weapons were discharged by the user controlling the controlled vehicle, and/or based on other factors). In these instances in which the reticle center substantially tracks the target vehicle, the reticle center may wobble, for example, as the controlled vehicle moves, as the target vehicle moves, shortly after guns and/or other weapons are discharged, and/or in other circumstances, such that the reticle center may track points within the outer perimeter of the target vehicle without remaining centered on the geometric center of the target vehicle (e.g., unless and until the controlled vehicle is stationary, the target vehicle is stationary, a predetermined amount of time has elapsed since one or more guns and/or other weapons were discharged, and/or the like). By varying the aim while substantially tracking the target vehicle in this manner, the computing device may increase the difficulty of the game and/or the challenge presented by the game, thereby increasing user engagement with the game.

In some embodiments, locking the camera-linked reticle onto the target vehicle may include maintaining aim of the camera-linked reticle on the target vehicle as the target vehicle moves from a first position to a second position. For example, similar to how the aim of the camera-linked reticle may be maintained as the controlled vehicle moves, the aim may be likewise maintained as the target vehicle moves (e.g., whether or not the controlled vehicle is also moving). Thus, regardless of whether the controlled vehicle is stationary or also moving in the virtual world, if the target vehicle is moving or begins moving (e.g., from one position to another, different position in the virtual world), the computing device may update the viewing angle as in the examples above so as to keep the camera-linked reticle on the target vehicle even as the target vehicle is changing positions within the virtual world. In addition, and as in the examples above in which the controlled vehicle is moving (instead of the target vehicle), the computing device may keep the reticle on the same point of the target vehicle or, alternatively, may keep the reticle substantially aiming at the target (e.g., even though the reticle center may aim at different parts of and/or points on the target vehicle as the target vehicle moves).

In some embodiments, locking the camera-linked reticle onto the target vehicle may include moving the camera-linked reticle to a geometric center of the target vehicle. For example, in initially locking the reticle onto the target vehicle (e.g., in step 915), the computing device may determine the geometric center of the target vehicle (e.g., either independently of the view of the controlled vehicle in virtual world coordinates or, alternatively, based on the view of the target vehicle from the controlled vehicle in screen coordinates) and subsequently may move the reticle to the determined geometric center of the target vehicle. In addition, once locked to the geometric center of the target vehicle, the computing device may maintain aim of the reticle on the geometric center of the target vehicle (e.g., as in the examples discussed above).

In some embodiments, the camera-linked reticle might not be locked onto the target vehicle (e.g., in step 915) unless the target vehicle is smaller than a predetermined size (e.g., based on the distance to the target vehicle, based on the actual size of the target vehicle, and/or based on other factors). In other words, one or more aspects of the follow-aim functionality discussed above might be disabled, in some instances, if the target vehicle is equal to and/or larger than a predetermined threshold size. Thus, in some arrangements, the computing device may apply one or more rules limiting when and/or how the reticle may be locked onto the target vehicle and/or otherwise controlling how such reticle-locking features may be used and/or applied. For example, the computing device may automatically lock the reticle to a target vehicle and/or to the geometric center of a target vehicle if the target vehicle is smaller than a predetermined size (which may, e.g., depend on the distance from the controlled vehicle to the target vehicle in the virtual world and/or may further depend on the actual size of the target vehicle in virtual world units and/or coordinates), and aspects of the follow-aim features discussed above may enable the reticle to stick to the geometric center of the target vehicle (e.g., so as to make aiming easier for the user in instances where the target is relatively small). On the other hand, when, for instance, the target vehicle exceeds the predetermined size, the follow-aim features discussed above might be disabled and instead, regular gameplay mechanics may be applied.

In some embodiments, locking the camera-linked reticle onto the target vehicle may include maintaining aim of the camera-linked reticle on the target vehicle until user input modifying a viewing angle is received. For example, the computing device may maintain the aim of the reticle on the target vehicle to keep the reticle locked onto the target vehicle until the computing device receives manually-provided user input (e.g., a touch-based swipe or drag command, one or more other gestures, etc.) changing the view of the virtual world and thus moving the reticle away from the target vehicle, for instance, onto a new target or onto no target. In this way, the user may be able to unlock the reticle from the target vehicle so as to aim at one or more other targets and/or other objects in the virtual world, because after such input is received, the computing device might no longer keep the reticle locked onto the target vehicle (e.g., unless the user again drags the reticle towards and/or onto the target vehicle, in which case the reticle may again be locked to the target vehicle in a manner similar to the way in which the reticle was initially locked onto the target vehicle in the examples discussed above).

Figure 10A:
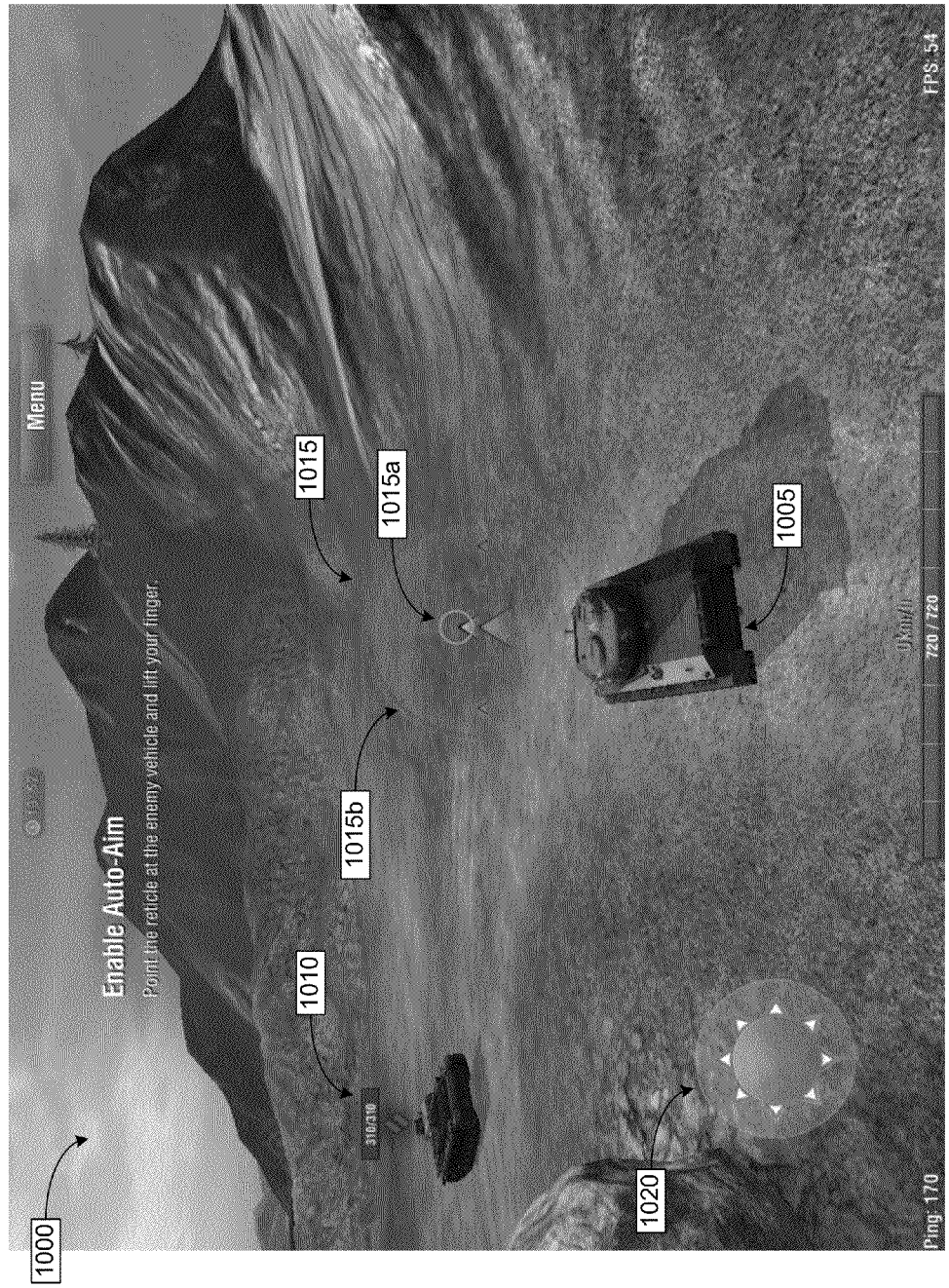
FIGS. 10A-10C depict example screenshots of video game user interfaces that may be displayed in dynamically locking a camera-linked reticle onto a target vehicle in accordance with one or more illustrative aspects discussed herein.
Figure 10B:
Figure 10C:
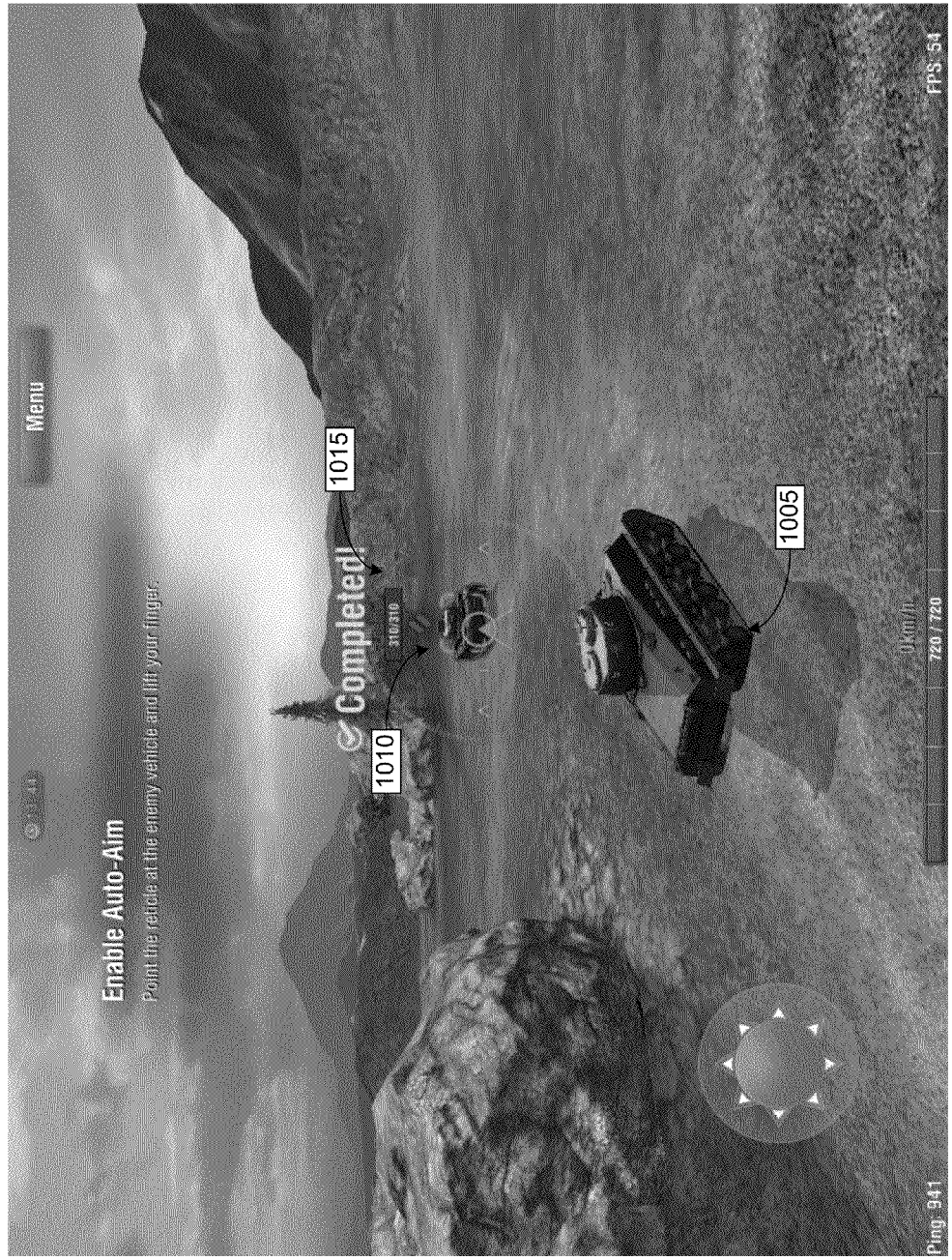
Figure 11A:
Figure 11B:
Figure 11D:
Figure 11E:
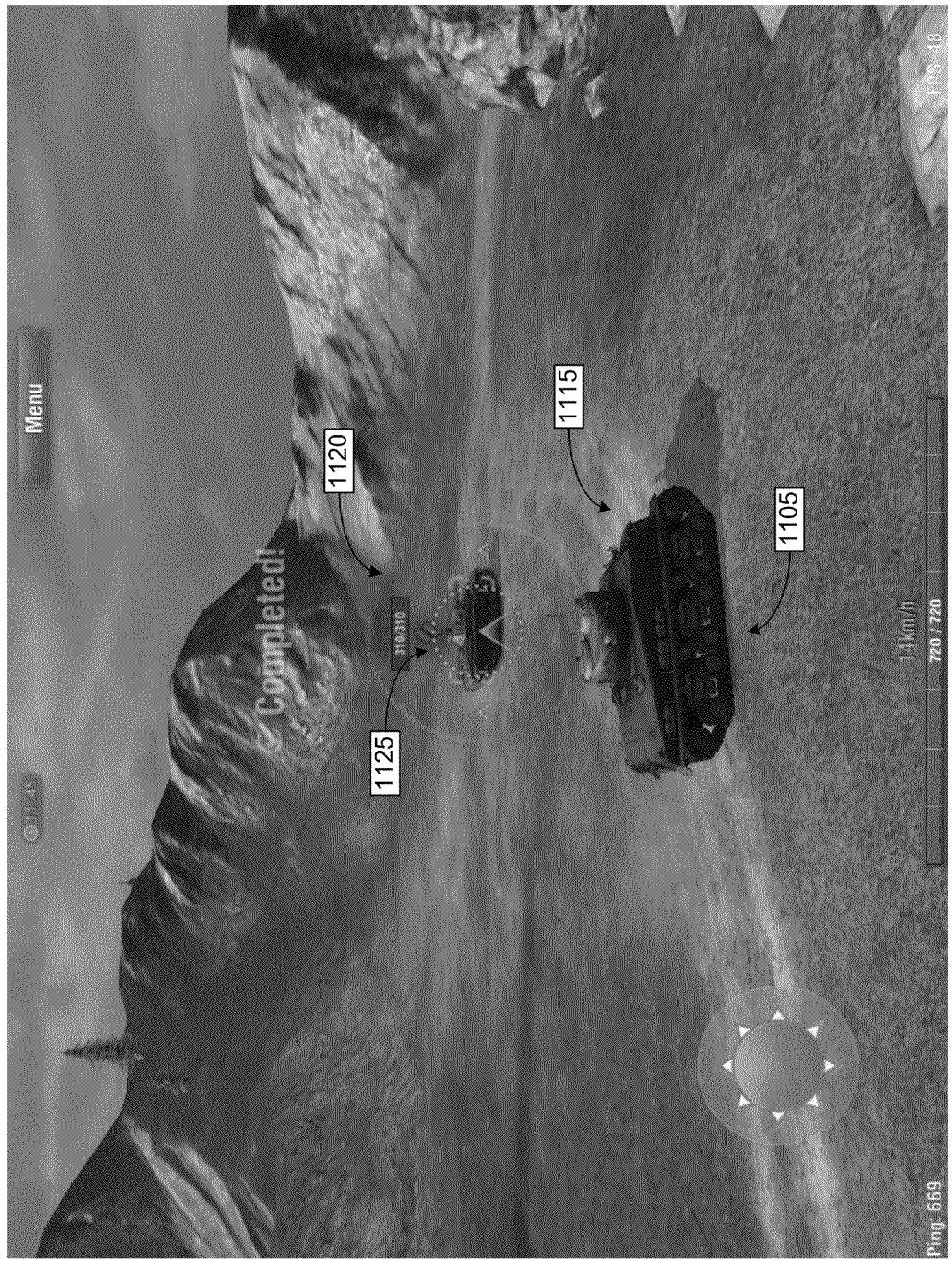

FIGS. 10A-10C depict example screenshots of video game user interfaces that may be displayed in dynamically locking a camera-linked reticle onto a target vehicle in accordance with one or more illustrative aspects discussed herein. In particular, FIGS. 10A-10C depict a series of screenshots illustrating how a camera-linked reticle may be automatically locked onto a target vehicle when the reticle is moved close to (e.g., within a predetermined distance of) the target vehicle (e.g., in a user interface that may be displayed and/or otherwise provided by a computing device). As illustrated in the examples discussed below, a camera-linked reticle may be automatically locked onto a target vehicle in instances in which a game is operating in a sniper mode (where, e.g., a first-person view of a virtual world may be provided), as well as in instances in which a game is operating in an arcade mode (where, e.g., a third-person view of a virtual world may be provided).

For instance, the example screenshot depicted in FIG. 10A illustrates a view of a virtual world 1000 and presents user interface controls for controlling a controlled vehicle 1005 included in the virtual world 1000. In addition, the screenshot depicted in FIG. 10A illustrates an example of the user interface that may be provided by a computing device in performing the method discussed above with respect to FIG. 9, such as in step 905 of the example method discussed above. As seen in FIG. 10A, the virtual world 1000 may include various surroundings (e.g., similar to virtual world 700, as discussed above with respect to FIG. 7A). For example, the virtual world 1000 may include a simulated terrain and an enemy vehicle 1010 that may targeted by the controlled vehicle 1005 and/or by the user thereof. As also seen in FIG. 10A, the view of the virtual world 1000 provided in this screenshot is a third-person view (e.g., an arcade mode view) of the controlled vehicle 1005 and its surroundings. In addition, the user interface presented in FIG. 10A includes various controls including a reticle 1015 (which may, e.g., be configured in the same manner as the reticle 705 discussed above with respect to FIG. 7B and/or may be a camera-linked reticle in accordance with various aspects of the disclosure) and a virtual joystick 1020 (which may, e.g., be operable in the same manner as joystick 720, as discussed above with respect to FIG. 7A).

In one or more arrangements, reticle 1015 may include a center aim portion 1015a (which may, e.g., allow a user to more precisely aim at a target) as well as an outer edge 1015b (which may, e.g., include one or more concentric circles oriented around the center aim portion 1015 and which may include one or more indicators, such as the dashes and arrows seen in FIG. 10A). The center aim portion 1015a may, for example, also include highlighting and/or other visual effects to make the center aim portion 1015a prominent (e.g., as compared to other portions of the user interface and/or the surroundings of the virtual world 1000).

In the example screenshot depicted in FIG. 10B, the user may move the camera and the reticle 1015 from the initial aim shown in FIG. 10A towards the target vehicle 1010 to more closely aim at the target vehicle 1010 and/or may select the target vehicle 1010 to move the aim of the camera and the reticle 1015 onto the target vehicle 1010. Once the aim of the reticle 1015 is moved close to (e.g., within a predetermined distance of the target vehicle 1010) and/or reaches the target vehicle 1010, the reticle 1015 may be locked onto the target vehicle 1010 in accordance with the example method steps discussed above. In some arrangements in which the user is providing touch-based user input to a computing device to move the reticle 1015 towards the target vehicle 1010 and/or to otherwise aim the reticle 1015, the reticle 1015 might not be locked onto the target vehicle until the user of the computing device lifts his or her finger from a touch-sensitive display screen on the computing device (which may, e.g., be presenting the example user interface illustrated in FIG. 10B).

In the example screenshot depicted in FIG. 10C, the computing device may lock the reticle 1015 onto the target vehicle 1010 based on the reticle 1015 having been moved within the requisite distance of the target vehicle 1010. As discussed above, once the reticle 1015 is locked onto the target vehicle 1010, the aim of the reticle 1015 may be maintained by the computing device even as the controlled vehicle 1005 and/or the target vehicle 1010 move and/or otherwise change position within the virtual world 1000.

FIGS. 11A-11E depict example screenshots of video game user interfaces that may be displayed in maintaining aim of a camera-linked reticle as a controlled vehicle moves in accordance with one or more illustrative aspects discussed herein. In particular, FIGS. 11A-11E depict a series of screenshots illustrating how the aim of a camera-linked reticle may be maintained as a controlled vehicle and/or a target vehicle move within a virtual world after the reticle is locked onto the target vehicle. In some instances, this functionality may be referred to as a "follow aim" feature, in that the camera, and thus the reticle, may follow or otherwise track the target vehicle even as one or both of the controlled vehicle and the target vehicle move and/or otherwise change position within the virtual world.

For example, the user interfaces depicted in the screenshots shown in FIGS. 11A-11E may be displayed after a reticle is locked onto a target vehicle (e.g., as discussed above with respect to FIGS. 10A-10C). In particular, as seen in FIGS. 11A-11E, as the controlled vehicle 1105 moves from an initial position 1110 in the virtual world 1100 to a new position 1115 in the virtual world 1100, the aim of the camera-linked reticle 1120 may be maintained, so as to keep the reticle 1120 on the target vehicle 1125. In the example screenshot depicted in FIG. 11B, the view of the controlled vehicle 1105 is obscured by a rock structure included in the virtual world 1100, but the reticle 1120 and the target vehicle 1125 are still in sight of the controlled vehicle 1105 as it moves towards the new position 1115. In the example screenshots depicted in FIGS. 11C and 11D, the controlled vehicle 1105 continues moving towards the new position 1115. In the example screenshot depicted in FIG. 11E, the controlled vehicle 1105 has arrived at the new position 1115, and the reticle 1120 remains locked onto the target vehicle 1125.

Figure 12A:
FIGS. 12A-12B depict example screenshots of video game user interfaces that may be displayed in unlocking a camera-linked reticle from a target vehicle in accordance with one or more illustrative aspects discussed herein.
Figure 12B:

FIGS. 12A-12B depict example screenshots of video game user interfaces that may be displayed in unlocking a camera-linked reticle from a target vehicle in accordance with one or more illustrative aspects discussed herein. In particular, FIGS. 12A and 12B depict a series of screenshots illustrating how a reticle that has been locked onto a target vehicle can be unlocked, such that the aim of the reticle is no longer maintained on the target vehicle. This may, for instance, allow a user (who may, e.g., be interacting with the user interface of the video game presented by the computing device) to disable the "follow aim" functionality discussed above.

For example, the example user interfaces depicted in the screenshots shown in FIGS. 12A and 12B may be displayed after a reticle is locked onto a target vehicle (e.g., as discussed above with respect to FIGS. 10A-10C) and after the controlled vehicle moves from one position to another while the reticle remains locked on the target vehicle (e.g., as discussed above with respect to FIGS. 11A-11E).

In particular, in the example screenshot depicted in FIG. 12A, controlled vehicle 1205 may be at a position in virtual world 1200, and target vehicle 1215 may be in view of the controlled vehicle 1205. In addition, reticle 1215 may be locked onto target vehicle 1210 such that the aim of reticle 1215, and correspondingly, one or more guns and/or other weapons of the controlled vehicle 1205, may be maintained if the controlled vehicle 1205 and/or the target vehicle 1210 change position. To unlock the reticle 1215 from the target vehicle 1210, a user may provide input modifying the viewing angle, in this case, by providing touch-based user input selecting the camera marker displayed within reticle 1215 and dragging it away from the target vehicle 1210. The example screenshot illustrated in FIG. 12A includes a tutorial overlay 1220 demonstrating this motion for the user to assist the user in learning how to unlock the reticle 1215 from the target vehicle 1210.

In the example screenshot depicted in FIG. 12B, the reticle 1215 has been unlocked from the target vehicle 1210 as a result of the user input being received by the computing device presenting the user interface of the video game. In addition, once the reticle 1215 has been unlocked from the target vehicle 1210, the aim of the reticle 1215 might no longer be maintained on the target vehicle 1210 in accordance with various aspects of the disclosure discussed above.

Figure 13:
FIG. 13 depicts an example screenshot of a video game user interface that may be displayed in providing multiple operating modes for a camera-linked reticle in accordance with one or more illustrative aspects discussed herein.

FIG. 13 depicts an example screenshot of a video game user interface that may be displayed in providing multiple operating modes for a camera-linked reticle in accordance with one or more illustrative aspects discussed herein. For instance, the example screenshot depicted in FIG. 13 illustrates a view of a virtual world 1300 and presents user interface controls for controlling a controlled vehicle 1305 in the virtual world 1300. In addition, virtual world 1300 includes various surroundings, as well as an enemy vehicle 1310. The user interface controls illustrated in FIG. 13 include a reticle 1315 (which may, e.g., be a camera-linked reticle in accordance with various aspects of the disclosure discussed above) and tread marks 1320.

In one or more arrangements, if a user selects the tread marks 1320 and/or otherwise interacts with the portion of the screen where tread marks 1320 are displayed, the camera might move (e.g., towards tread marks 1320), but the turret on the controlled vehicle 1305 might not move with the camera. In this instance, the reticle 1315 may be dynamically unlinked from the camera, as the aim of the turret might not change even as the view provided by the camera is changing. Alternatively, if the user selects any other portion of the screen (e.g., any portion of the screen illustrated in FIG. 13 where the tread marks 1320 are not displayed), both the gun marker of the reticle and the camera may move together towards the selected portion of the screen. In this instance, the reticle 1315 may remain linked to the camera and accordingly may move with both the camera and the turret on the controlled vehicle 1305. In one or more arrangements, the tread marks 1320 and this associated functionality may thus provide the user with a quick way to look around the virtual world without changing the position of the gun marker included in the reticle (because, e.g., the reticle might not follow the camera in instances where the tread marks 1320 are selected). This functionality may thus help the user to see what may be going on behind the controlled vehicle 1305 in the virtual world 1300 while still maintaining the follow aim or the manual aim of the reticle 1315.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable memory. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims are included in the scope of the present disclosure. For example, the steps illustrated in the illustrative figures may be performed in other than the recited order, and one or more steps illustrated may be optional in accordance with aspects of the disclosure.

What is claimed is:

1. A method, comprising:
providing, by a computing device, a user interface that includes a view of a controlled vehicle and a target vehicle in a virtual world associated with a video game;
receiving, by the computing device, touch-based user input moving a camera-linked reticle within a predetermined distance of the target vehicle; and
in response to receiving the touch-based user input moving the camera-linked reticle within the predetermined distance of the target vehicle, locking, by the computing device, the camera-linked reticle onto the target vehicle,
wherein the predetermined distance is a radius of a circle defining a sticky zone around the target vehicle, and the radius of the circle defining the sticky zone around the target vehicle is determined based on a distance from the controlled vehicle to the target vehicle in the virtual world.

2. The method of claim 1, wherein the camera-linked reticle includes a reticle portion of the user interface that is configured to indicate an aim of at least one gun associated with the controlled vehicle, and is further configured to maintain a substantially constant directional relationship with a viewing angle.

3. The method of claim 1, wherein locking the camera-linked reticle onto the target vehicle includes moving the camera-linked reticle to a geometric center of the target vehicle.

4. The method of claim 1, further comprising:
after locking the camera-linked reticle onto the target vehicle:
receiving, by the computing device, user input moving the controlled vehicle from a first position to a second position; and
maintaining, by the computing device, aim of the camera-linked reticle on the target vehicle as the controlled vehicle moves from the first position to the second position.

5. The method of claim 1, wherein locking the camera-linked reticle onto the target vehicle includes maintaining aim of the camera-linked reticle on the target vehicle as the target vehicle moves from a first position to a second position.

6. The method of claim 1, wherein locking the camera-linked reticle onto the target vehicle includes maintaining aim of the camera-linked reticle on the target vehicle until touch-based user input modifying a viewing angle is received.

7. The method of claim 1,
wherein the controlled vehicle is controlled by a user of the computing device, and
wherein the user interface includes an arcade view of the controlled vehicle and the target vehicle.

8. The method of claim 1, wherein locking the camera-linked reticle onto the target vehicle includes snapping the camera-linked reticle to the center of target vehicle if the distance from the controlled vehicle to the target vehicle exceeds a predefined threshold, and leaving the camera-linked reticle on a point of the target vehicle without snapping the camera-linked reticle if the distance from the controlled vehicle to the target vehicle does not exceed the predefined threshold.

9. The method of claim 1, wherein the camera-linked reticle is configured to wobble as the controlled vehicle moves in the virtual world based on a speed or direction of motion of the controlled vehicle.

10. The method of claim 1, wherein the computing device is configured to disable automatic locking of the camera-linked reticle onto the target vehicle based on the distance from the controlled vehicle to the target vehicle in the virtual world.

11. A computing device, comprising:
   at least one processor; and
   memory storing computer-readable instructions that, when executed by the at least one processor, cause the computing device to:
      provide a user interface that includes a view of a controlled vehicle and a target vehicle in a virtual world associated with a video game;
      receive touch-based user input moving a camera-linked reticle within a predetermined distance of the target vehicle; and
      in response to receiving the touch-based user input moving the camera-linked reticle within the predetermined distance of the target vehicle, lock the camera-linked reticle onto the target vehicle,
   wherein the predetermined distance is a radius of a circle defining a sticky zone around the target vehicle, and the radius of the circle defining the sticky zone around the target vehicle is determined based on a distance from the controlled vehicle to the target vehicle in the virtual world.

12. The computing device of claim 11, wherein the camera-linked reticle includes a reticle portion of the user interface that is configured to indicate an aim of at least one gun associated with the controlled vehicle, and is further configured to maintain a substantially constant directional relationship with a viewing angle.

13. The computing device of claim 11, wherein locking the camera-linked reticle onto the target vehicle includes moving the camera-linked reticle to a geometric center of the target vehicle.

14. The computing device of claim 11, wherein the memory stores additional computer-readable instructions that, when executed by the at least one processor, further cause the computing device to:
   after locking the camera-linked reticle onto the target vehicle:
      receive user input moving the controlled vehicle from a first position to a second position; and
      maintain aim of the camera-linked reticle on the target vehicle as the controlled vehicle moves from the first position to the second position.

15. The computing device of claim 11, wherein locking the camera-linked reticle onto the target vehicle includes maintaining aim of the camera-linked reticle on the target vehicle as the target vehicle moves from a first position to a second position.

16. The computing device of claim 11, wherein locking the camera-linked reticle onto the target vehicle includes maintaining aim of the camera-linked reticle on the target vehicle until touch-based user input modifying a viewing angle is received.

17. The computing device of claim 11,
   wherein the controlled vehicle is controlled by a user of the computing device, and
   wherein the user interface includes an arcade view of the controlled vehicle and the target vehicle.

18. One or more non-transitory computer-readable media storing computer-executable instructions that, when executed, cause a computing device to:
   provide a user interface that includes a view of a controlled vehicle and a target vehicle in a virtual world associated with a video game;
   receive touch-based user input moving a camera-linked reticle within a predetermined distance of the target vehicle; and
   in response to receiving the touch-based user input moving the camera-linked reticle within the predetermined distance of the target vehicle, lock the camera-linked reticle onto the target vehicle,
   wherein the predetermined distance is a radius of a circle defining a sticky zone around the target vehicle, and the radius of the circle defining the sticky zone around the target vehicle is determined based on a distance from the controlled vehicle to the target vehicle in the virtual world.

19. The one or more non-transitory computer-readable media of claim 18, wherein the camera-linked reticle includes a reticle portion of the user interface that is configured to indicate an aim of at least one gun associated with the controlled vehicle, and is further configured to maintain a substantially constant directional relationship with a viewing angle.

20. The one or more non-transitory computer-readable media of claim 18, wherein locking the camera-linked reticle onto the target vehicle includes moving the camera-linked reticle to a geometric center of the target vehicle.

21. The one or more non-transitory computer-readable media of claim 18, having additional computer-executable instructions stored thereon that, when executed, further cause the computing device to:
   after locking the camera-linked reticle onto the target vehicle:
      receive user input moving the controlled vehicle from a first position to a second position; and
      maintain aim of the camera-linked reticle on the target vehicle as the controlled vehicle moves from the first position to the second position.

22. The one or more non-transitory computer-readable media of claim 18, wherein locking the camera-linked reticle onto the target vehicle includes maintaining aim of the camera-linked reticle on the target vehicle as the target vehicle moves from a first position to a second position.

23. The one or more non-transitory computer-readable media of claim 18, wherein locking the camera-linked reticle onto the target vehicle includes maintaining aim of the camera-linked reticle on the target vehicle until touch-based user input modifying a viewing angle is received.

24. The one or more non-transitory computer-readable media of claim 18,
   wherein the controlled vehicle is controlled by a user of the computing device, and
   wherein the user interface includes an arcade view of the controlled vehicle and the target vehicle.

\* \* \* \* \*